US009049718B2

United States Patent
Kim et al.

(10) Patent No.: US 9,049,718 B2
(45) Date of Patent: *Jun. 2, 2015

(54) METHOD AND APPARATUS FOR LAYER 2 ARQ FOR PACKETS

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Himke Van Der Velde, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 97 days.

This patent is subject to a terminal disclaimer.

(21) Appl. No.: 13/712,341

(22) Filed: Dec. 12, 2012

(65) Prior Publication Data

US 2013/0100939 A1    Apr. 25, 2013

Related U.S. Application Data

(63) Continuation of application No. 12/117,868, filed on May 9, 2008, now Pat. No. 8,351,380.

(30) Foreign Application Priority Data

May 9, 2007 (KR) .................. 10-2007-0045243
Sep. 21, 2007 (KR) .................. 10-2007-0096982
Apr. 1, 2008 (KR) .................. 10-2008-0030462

(51) Int. Cl.

| | |
|---|---|
| *H04J 3/16* | (2006.01) |
| *H04W 4/00* | (2009.01) |
| *H04W 72/04* | (2009.01) |
| *H04L 1/16* | (2006.01) |
| *H04L 1/18* | (2006.01) |
| *H04W 28/06* | (2009.01) |

(Continued)

(52) U.S. Cl.
CPC ........... *H04W 72/044* (2013.01); *H04L 1/1685* (2013.01); *H04L 1/1854* (2013.01); *H04L 1/1883* (2013.01); *H04W 28/06* (2013.01); *H04W 80/02* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 5,633,874 | A | 5/1997 | Diachina et al. |
| 6,643,813 | B1 | 11/2003 | Johansson et al. |
| 6,961,349 | B2 | 11/2005 | Malomsoky et al. |

(Continued)

FOREIGN PATENT DOCUMENTS

KR    1020060090191    8/2006

OTHER PUBLICATIONS

Alcatel-Lucent, "Consideration on the Polling Request for the Isolated or Last Data Transmission in LTE", R2-071662, 3GPP TSG RAN WG2 Meeting #58, May 7-11, 2007.

*Primary Examiner* — Chi H Pham
*Assistant Examiner* — Soon-Dong D Hyun
(74) *Attorney, Agent, or Firm* — The Farrell Law Firm, P.C.

(57) ABSTRACT

A method and a transmitter are provided for performing packet ARQ in a communication system. A first RLC PDU is generated. The first RLC PDU includes polling information having a predetermined bit, when there is no subsequent RLC PDU transmission after transmission of the first RLC PDU. A timer is started or restarted when the first RLC PDU is transmitted to a receiver. The polling information having a predetermined bit is transmitted when the timer expires.

24 Claims, 20 Drawing Sheets

(51) Int. Cl.
*H04W 80/02* (2009.01)
*H04W 80/06* (2009.01)

(56) References Cited

U.S. PATENT DOCUMENTS

| | | | |
|---|---|---|---|
| 7,069,490 B2 | 6/2006 | Niu et al. | |
| 7,096,400 B2 | 8/2006 | Lim et al. | |
| 7,130,295 B2 | 10/2006 | Kim et al. | |
| 7,471,629 B2 | 12/2008 | Melpignano | |
| 7,710,911 B2 | 5/2010 | Terry | |
| 2004/0196861 A1 | 10/2004 | Rinchiuso et al. | |
| 2006/0251105 A1 | 11/2006 | Kim et al. | |
| 2008/0225824 A1 | 9/2008 | Meylan et al. | |
| 2008/0227443 A1 | 9/2008 | Whinnett | |
| 2008/0279171 A1 | 11/2008 | Kim et al. | |
| 2009/0003283 A1* | 1/2009 | Meylan | 370/331 |
| 2009/0103445 A1* | 4/2009 | Sammour et al. | 370/252 |
| 2009/0228126 A1 | 9/2009 | Spielberg et al. | |
| 2010/0128669 A1* | 5/2010 | Chun et al. | 370/328 |
| 2011/0317719 A1* | 12/2011 | Vedantham et al. | 370/469 |
| 2012/0243489 A1* | 9/2012 | Pirskanen et al. | 370/329 |

\* cited by examiner

METHOD AND APPARATUS FOR LAYER 2 ARQ FOR PACKETS

PRIORITY

This application is a Continuation Application of U.S. patent application Ser. No. 12/117,868, filed on May 9, 2008, which claims priority to a Korean Patent Application filed in the Korean Intellectual Property Office on May 9, 2007 and assigned Serial No. 10-2007-0045243, a Korean Patent Application filed in the Korean Intellectual Property Office on Sep. 21, 2007 and assigned Ser. No. 10-2007-0096982, and a Korean Patent Application filed in the Korean Intellectual Property Office on Apr. 1, 2008 and assigned Serial No. 10-2008-0030462, the disclosure of each of which is incorporated herein by reference.

BACKGROUND OF THE INVENTION

1. Field of the Invention

The present invention relates generally to an Automatic Repeat reQuest (ARQ) method and apparatus in a mobile communication system, and in particular, to a method and apparatus for preventing small packets from being independently transmitted, and guaranteeing transmission reliability of upper layer packets which are independently transmitted.

2. Description of the Related Art

Since the normal ARQ technique in which a receiver determines whether to send a retransmission request using a gap between sequence numbers is not applied to the independently transmitted upper layer packets, reliability of the transmission is guaranteed using polling/timer-based retransmission.

The term 'polling/timer-based retransmission' refers to a technique for transmitting an indicator for ordering a receiver to report an acknowledgement (ACK) while transmitting a packet that should be guaranteed transmission reliability, and automatically retransmitting the packet if the acknowledgement is not reported within a predetermined time. In this scheme, for each upper layer packet, its reception status report is transmitted.

However, in the current service, it is frequent that an upper layer packet in one direction generates a response packet in the opposite direction, an exchange of the upper layer packet and its reception status report occurs continuously. For example, referring to FIG. 1, in a Transmission Control Protocol (TCP)-based packet service, a TCP packet or Layer 3 (L3) control request message 115 generates a TCP ACK or L3 control response message 120 in the opposite direction to the transmission direction. The L3 control message is an arbitrary control message generated in an upper layer of Layer 2 (L2), and can be, for example, a control message of an Internet Protocol (IP) call control protocol such as Session Initiation Protocol (SIP), or a control protocol of a radio network such as Radio Resource Control (RRC).

With reference to FIG. 2, a description will be made of a situation where the exchange of the TCP packet or L3 control request message and the TCP ACK or L3 control response message is performed in Radio Link Control (RLC) which is an L2 ARQ protocol.

Referring to FIG. 2, if one RLC device 210 transmits a TCP packet or L3 control request message to another RLC device 205 in step 215, the other RLC device 205 transmits a reception status report for the TCP packet or L3 control request message to the RLC device 210 in step 225. After a lapse of a predetermined time, if a TCP ACK or L3 control response message occurs, the other RLC device 205 transmits it to the RLC device 210 in step 235, and the RLC device 210 transmits a reception status report for the TCP ACK or L3 control response message to the other RLC device 205 in step 240.

More specifically, in step 215, the RLC device 205 resegments the TCP packet or L3 control request message in a size suitable for transmission through a radio channel, attaches a sequence number to the segment, and transmits the segment through the radio channel. The sequence number-attached segment is called an 'RLC Protocol Data Unit (PDU)'. In particular, the RLC device 210, when transmitting the last RLC PDU, includes polling information in the RLC PDU. The polling information is for requesting the other RLC device to send a reception status report. In order to check the transmission status of the transmitted RLC PDUs, including the last RLC PDU, the RLC device generally transmits the last RLC PDU along with the polling information.

In preparation for the case where an RLC PDU containing the polling information is lost during its transmission or a status report responsive to the polling is lost during its transmission, the RLC device 210 performs timer-based retransmission on the RLC PDU containing the polling information. In other words, the RLC device 210 starts a polling timer 245 while transmitting an RLC PDU containing polling information, and retransmits the RLC PDU containing polling information if no status report is received until the polling timer expires.

Upon receiving the RLC PDU containing polling information, the RLC device 205 generates a status report and transmits the status report to the RLC device 210 in step 225. At this point, an L2 processing delay 220 occurs.

Since TCP data or L3 control request message is included in the RLC PDU containing polling information, the TCP data or L3 control request message is delivered to an upper layer. Then the upper layer, after an L3 transmission (processing) delay 230, generates a TCP ACK or L3 control response message and delivers it to the RLC device 205. In response, the RLC device 205 generates the TCP ACK or L3 control response message into an RLC PDU and transmits it to the RLC device 210 in step 235. Since a size of the TCP ACK or L3 control message is only several tens of bytes in most cases, it is included in one RLC PDU before being transmitted. In other words, since the RLC PDU containing the TCP ACK or L3 control message is the last RLC PDU, polling information is also included in the RLC PDU before being transmitted. As a response to the polling, the RLC device 210 transmits an L2 status report in step 240.

As described above, the last RLC PDU containing TCP data, as polling information is included therein, induces an L2 status report from the opposite side. The TCP data also causes an L3 response message such as TCP ACK, and the L3 response message such as TCP ACK also causes an L2 status report.

Frequently transmitting and receiving the small-sized packets over a radio channel individually in this way may cause a decrease in efficiency of radio transmission resources.

SUMMARY OF THE INVENTION

An aspect of the present invention is to address at least the problems and/or disadvantages described above and to provide at least the advantages described below. Accordingly, an aspect of the present invention is to provide a method and apparatus for allowing small-sized packets to be transmitted together if possible, rather than being frequently transmitted and received over a radio channel individually, thereby increasing efficiency of radio transmission resources.

Another aspect of the present invention is to provide a method and apparatus for guaranteeing transmission reliability of individually transmitted upper layer packets without using a reception status report, thereby increasing efficiency of radio transmission resources.

According to one aspect of the present invention, a packet ARQ method performed by a transmitter in a communication system is provided. A first RLC PDU is generated. The first RLC PDU includes polling information having a predetermined bit, when there is no subsequent RLC PDU transmission after transmission of the first RLC PDU. A timer is started or restarted when the first RLC PDU is transmitted to a receiver. The polling information having a predetermined bit is transmitted when the timer expires.

According to another aspect of the present invention, a transmitter is provided for performing packet ARQ in a communication system. The transmitter includes a controller for generating a first RLC PDU, where the first RLC PDU includes polling information having a predetermined bit, when there is no subsequent RLC PDU transmission after transmission of the first RLC PDU and starting or restarting a timer when the first RLC PDU is transmitted to a receiver. The transmitter also includes a transmission unit for transmitting the polling information having a predetermined bit when the timer expires.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness. Terms used herein are defined based on functions in the present invention and may vary according to users, operators' intention or usual practices. Therefore, the definition of the terms should be made based on contents throughout the specification.

The present invention provides a method and apparatus for allowing small-sized packets to be transmitted together if possible, rather than being frequently transmitted and received over a radio channel individually, thereby increasing efficiency of radio transmission resources.

In addition, the present invention provides a method and apparatus for guaranteeing transmission reliability of individually transmitted upper layer packets without using a reception status report, thereby increasing efficiency of radio transmission resources.

Figure 1:
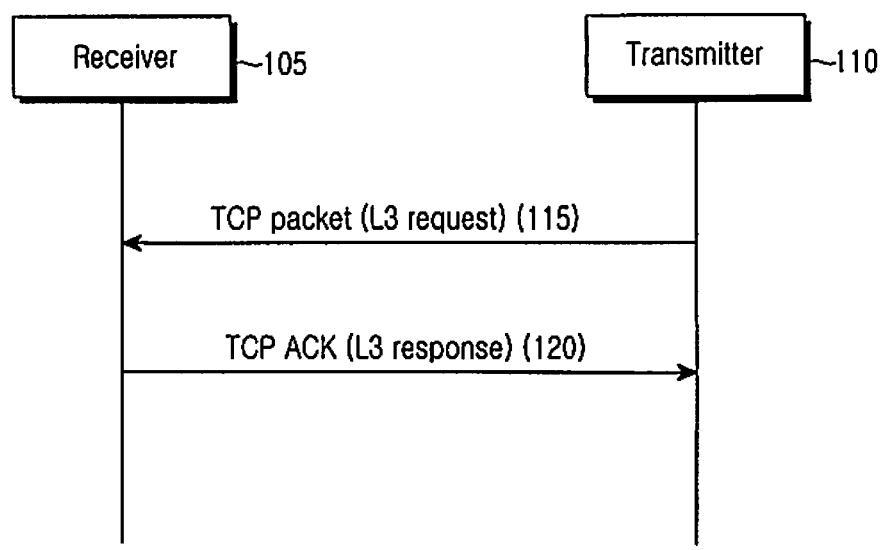
FIG. 1 is a diagram illustrating an exemplary exchange of upper layer packets.
Figure 2:
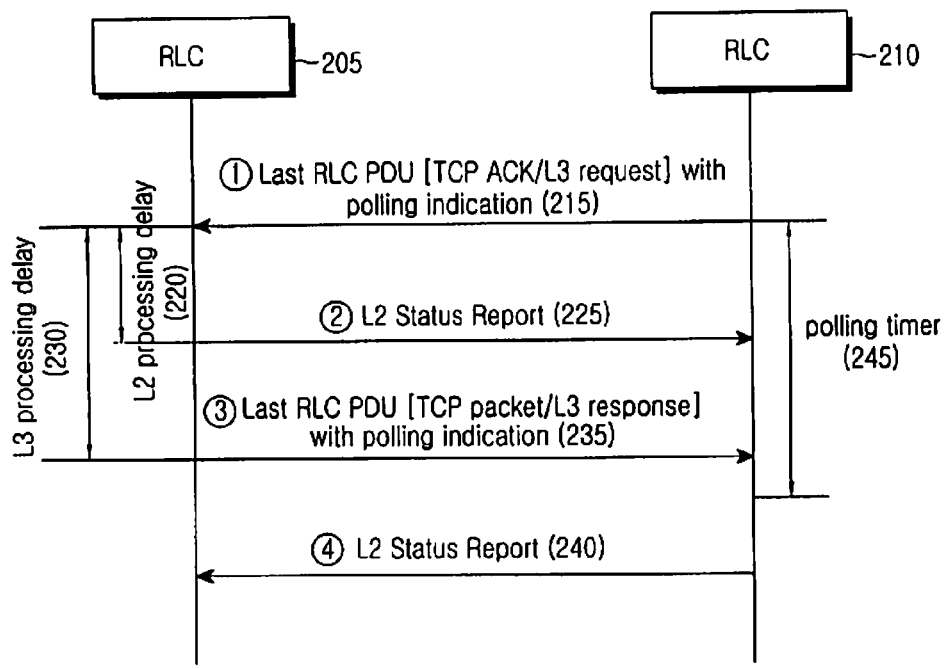
FIG. 2 is a diagram illustrating an exemplary exchange of individually transmitted upper layer packets, performed by L2 ARQ protocol.
Figure 3:
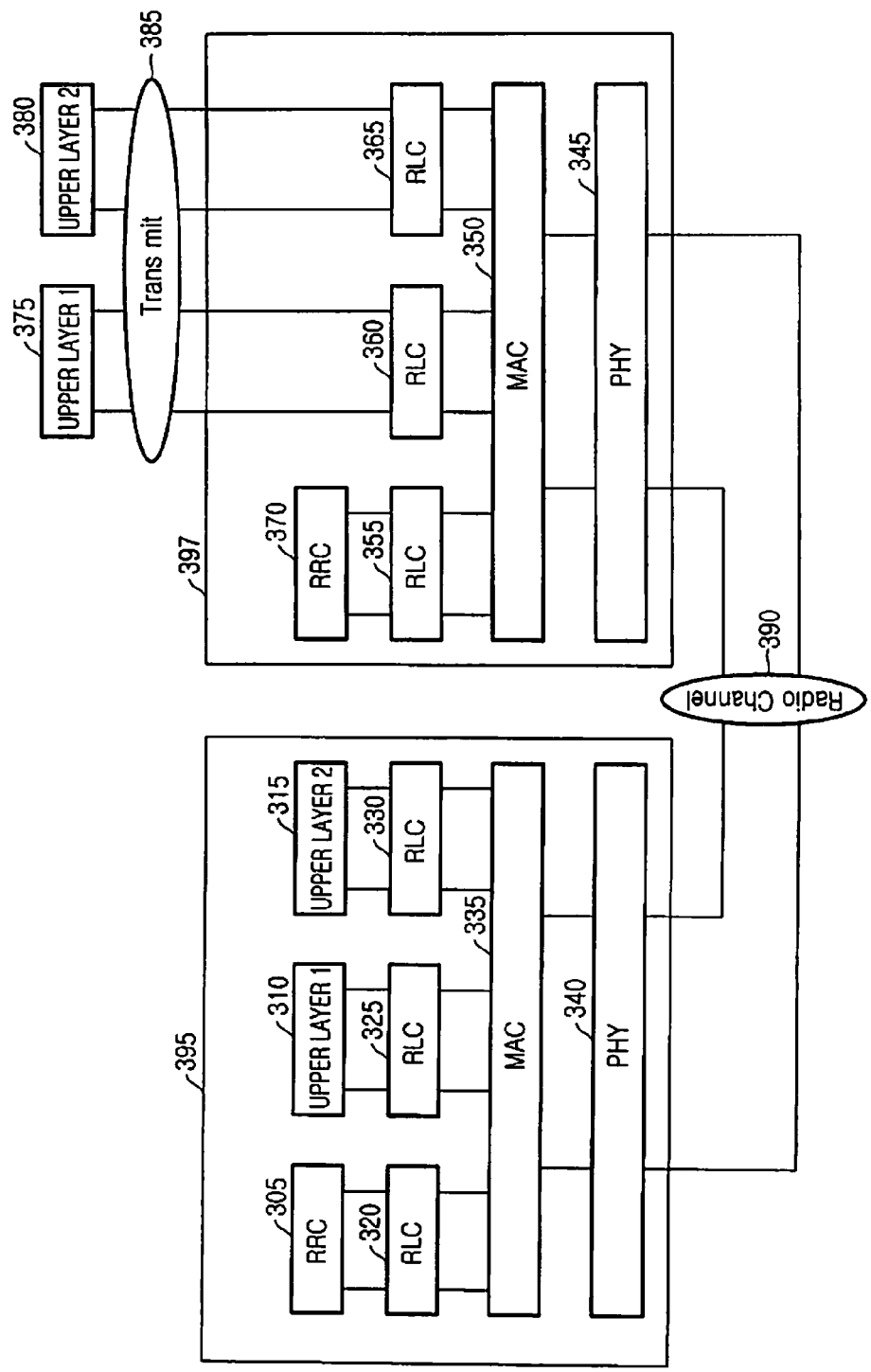
FIG. 3 is a diagram illustrating a protocol structure of an LTE mobile communication system.

FIG. 3 illustrates a protocol layer structure of a Long Term Evolution (LTE) communication system to which the present invention is applied.

In a terminal 395 where multiple services are set, as many upper layer devices as the services and one RRC layer device are established. An RLC device is individually constructed in each of the upper layer devices and RRC layer device.

For example, as shown in FIG. 3, in the terminal 395 where 2 services are set, an RRC layer device 305 and upper layer devices 310 and 315, associated individually with the services, are established.

The RRC 305 is a layer for processing a control message associated with radio transmission resources, and the upper layer devices 310 and 315, which are layers serving as L2 interfaces with the services, can be a set of protocols such as, for example, Transmission Control Protocol/Internet Protocol (TCP/IP) or RTP/UPD/IP. Although not illustrated in the drawing, a separate layer in charge of encryption/decryption or header compression/decompression can exist in an upper layer of the RLC device. The RRC layer device 305 and the upper layer devices 310 and 315 associated with their corresponding services transmit/receive data interactively, and are connected to RLC devices 320, 325 and 330, respectively, which also transmit/receive RLC PDUs interactively.

The RLC device, as described above, performs a framing operation of constructing upper layer data in a size suitable for transmission/reception through a radio channel, and an ARQ operation for allowing an RLC PDU to be transmitted to the opposite RLC device with reliability. The ARQ operation includes a first process of attaching a sequence number to each RLC PDU before transmission, a second process in which if a predetermined condition is satisfied, an RLC PDU receiving side notifies acknowledgements of RLC PDUs to an RLC PDU transmitting side, and a third process in which based on the information, the RLC PDU transmitting side retransmits the reception-failed RLC PDUs. The acknowledgement information of RLC PDUs and retransmission request information for RLC PDUs will be referred to herein as a 'status report'.

The RLC PDUs generated in the multiple RLC devices are multiplexed into one packet called a Medium Access Control (MAC) PDU in a MAC layer device 335, and then transmitted to a base station 397 via a physical layer 340.

A MAC layer device 350 of the base station 397 demultiplexes a MAC PDU into RLC PDUs and delivers the RLC PDUs to proper RLC devices, and the RLC devices each check sequence numbers of the received RLC PDUs to determine if there is any missing RLC PDU, and if there is a missing RLC PDU, the corresponding RLC device issues a retransmission request for the missing RLC PDU when a predetermined condition is satisfied. RLC devices 355, 360 and 365 reassemble the received RLC PDUs in upper layer packets and deliver them to their associated upper layers. For RRC, an RRC layer device 370 is situated in the base station 397, and for other services, it is situated in the opposite end or server, so that the RLC PDU is delivered to upper layers 375 and 380 via a transmission network 385.

Generally, the MAC layer device and the RLC layer devices are classified as L2, while upper layers of L2 are classified as L3. The term 'L3 data' as used herein refers to the data generated in upper layers of L2.

First Embodiment

In a first embodiment of the present invention, an RLC device, when it has received polling information, generates a reception status report after waiting a predetermined time without immediately generating the reception status report, if there is a high possibility that an upper layer packet received along with the polling information will generate an upper layer packet in the opposite direction. If an upper layer packet occurs during the predetermined waiting time, the RLC device transmits a reception status report along with the upper layer packet, thereby preventing the waste of transmission resources caused by the individual transmission of the reception status report and the upper layer packet.

The possibility that an arbitrary upper layer packet will generate a new upper layer packet in the opposite direction can be determined according to the type of the service connected to the RLC device and/or the property of the upper layer packet.

For instance, in the multimedia streaming service among User Datagram Protocol (UDP)-based services, since multimedia data does not generate feedback data in the opposite direction, an upper layer packet does not generate a new upper layer packet in the opposite direction. However, in the TCP-based service, a TCP ACK occurs for every predetermined number of TCP segments, there is a high possibility that an upper layer packet will generate an upper layer packet in the opposite direction. Further, in a control protocol such as RRC, since a request-response based message exchange is generally used, there is a high possibility that an upper layer packet will generate an upper layer packet in the opposite direction.

In the present invention, the RLC device responds to the polling information with the following two different schemes.

A first polling information-responding scheme, like the conventional scheme, generates and transmits a reception status report upon receipt of polling information, without waiting for the generation an upper layer packet.

A second polling information-responding scheme, when it receives polling information, generates and transmits a reception status report after waiting a predetermined period, thereby increasing the possibility that an upper layer packet and a reception status report will be transmitted together.

For reference, the situation where polling information is received means the situation where the polling information becomes effective as the reordering on an RLC PDU is completed, which was received along with the polling information or contains polling information.

An RLC device, when transmitting polling information, can transmit information indicating which polling information-responding scheme the RLC device will use together with the polling information. Herein, polling information indicating an intension to use the first polling information-responding scheme will be referred to as 'type-1 polling information', and polling information indicating an intention to use the second polling information-responding scheme will be referred to as 'type-2 polling information'.

Alternatively, every RLC device can be previously set as to which polling information-responding scheme it will use. For example, an RLC device connected to a UDP-based multimedia streaming service can be set to always use the first polling information-responding scheme, while an RLC device connected to the TCP-based file download service can be set to always use the second polling information-responding scheme.

For the sake of convenience, the last RLC PDU 215 containing polling information and upper layer data having a high possibility that it will cause the generation of upper layer data in the opposite direction will be referred to as a 'message #1'; the reception status report 220 which is a response to the polling information will be referred to as a 'message #2'; the last RLC PDU 235 containing upper layer data in the opposite direction and polling information will be referred to as a 'message #3'; and the reception status report 240 which is a response to the polling information will be referred to as a 'message #4'.

In sum, the first embodiment of the present invention transmits the message #2 and the message #3 together, thereby reducing the resource waste caused by the individual transmission of messages. For reference, when individually transmitting small-sized messages, the conventional RLC device should separately report a buffer status and should be allocated transmission resources every time the RLC device transmits the messages. Therefore, as the size of the messages is smaller, it is inefficient to transmit the messages individually.

Figure 4:
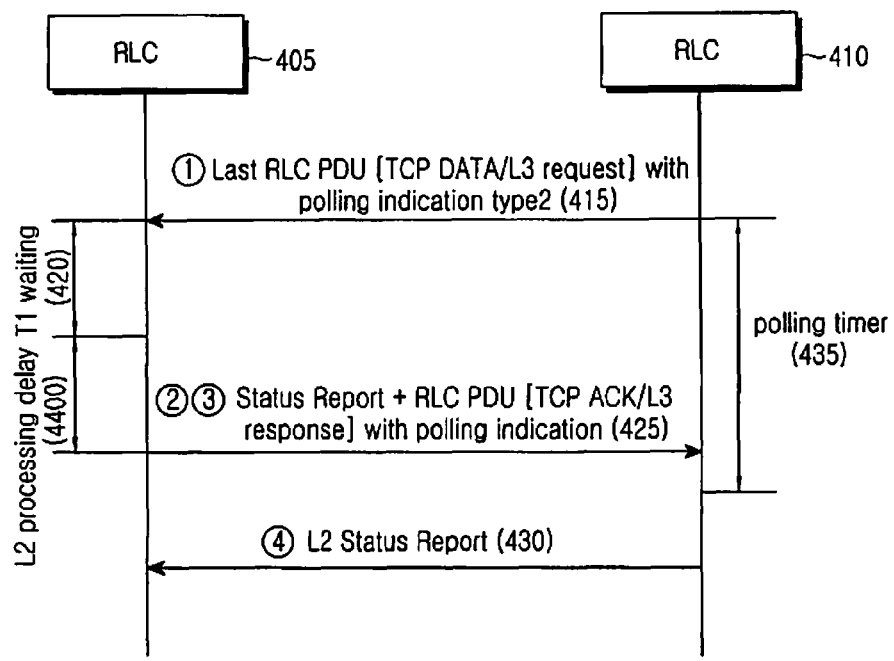
FIG. 4 is a signal flow diagram illustrating an overall operation according to a first embodiment of the present invention.

FIG. 4 is a signal flow diagram for a description of the first embodiment of the present invention.

Referring to FIG. 4, an RLC device 410, which is transmitting data in an arbitrary direction, transmits the last RLC PDU at an arbitrary time in step 415. If data included in the RLC PDU is an arbitrary L3 control request message or a TCP segment, the RLC device 410 transmits the RLC PDU along with type-2 polling information. For simpler realization, a terminal and a base station can previously set a polling type for each radio bearer individually. In this case, an RLC device transmitting polling information has no need to separately indicate the polling type, and transmits the polling information to the opposite RLC device along with the RLC PDU, like the conventional RLC device.

An RLC device 405 which has received the RLC PDU along with the type-2 polling information, or an RLC device 405 which has received an RLC PDU along with polling information and is set to use the second polling information-responding scheme, starts a predetermined timer T1 (See 420), and then reassembles the upper layer data from the RLC PDU and delivers it to an upper layer. If T1 expires or if new data arrives from the upper layer even though T1 has not expired, the RLC device 405 starts a procedure for transmitting a reception status report and upper layer data. That is, the RLC device 405 transmits to a scheduler a buffer status report for requesting allocation of transmission resources for transmission of the reception status report and upper layer data, and is allocated transmission resources from the scheduler. Then the RLC device 405 transmits a status report and upper layer data together using the allocated transmission resources in step 425. If all of the upper layer data is included one RLC PDU, the RLC device 405 includes polling information in the RLC PDU before transmission in order to check successful transmission of the RLC PDU. Upon receiving the RLC PDU and polling information, the RLC device 410 generates a reception status report indicating successful receipt of the RLC PDU and transmits it to the opposite RLC device 405 in step 430.

As described above, when the RLC PDU containing data having a high possibility that it will cause generation of upper layer data in the opposite direction is received along with polling information, the embodiment allows the RLC device to generate a reception status report after waiting a predetermined time, thereby increasing the possibility that the reception status report and upper layer data will be transmitted together.

Figure 5:
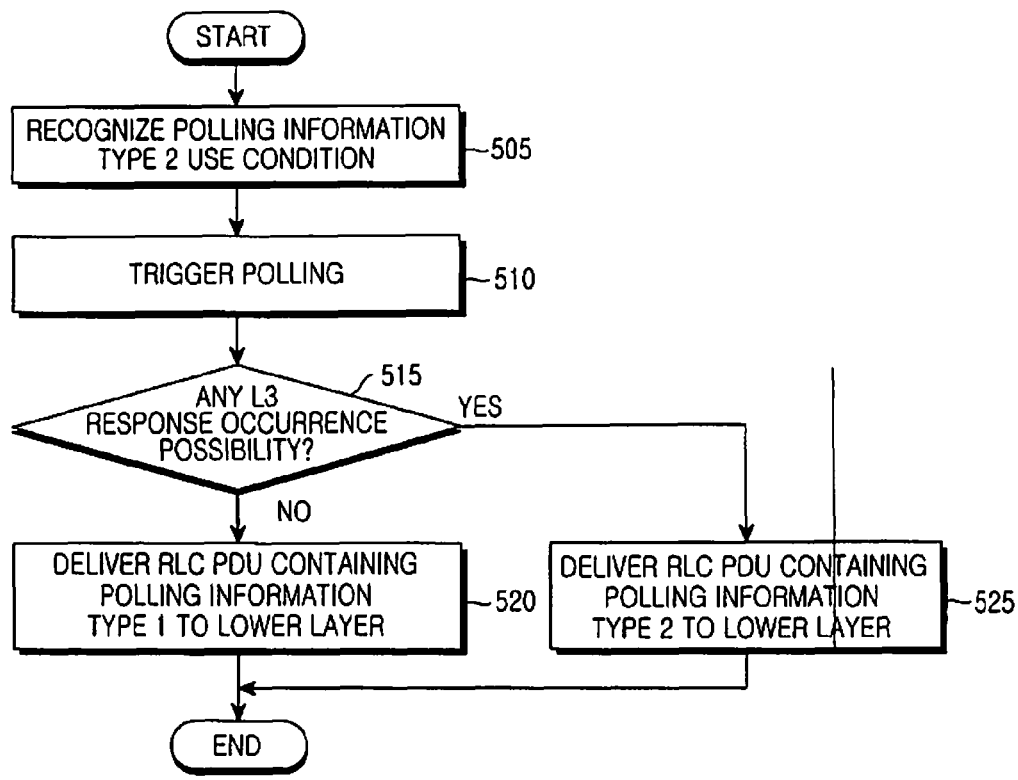
FIG. 5 is a signal flow diagram illustrating an operation of an RLC device for transmitting polling information according to the first embodiment of the present invention.

FIG. 5 is a signal flow diagram illustrating an operation of an RLC device for transmitting polling information according to the first embodiment of the present invention.

In step 505, an RLC device recognizes a use condition of type-2 polling information. The type-2 polling information is used when there is a high possibility that data contained in an RLC PDU transmitted along with the polling information will cause an upper layer response message, and the type-2 polling information use condition can be defined as follows, by way of example.

An upper layer designates a polling type to use, and notifies choice to the RLC device. Among L3 control messages such as an RRC message, some messages are request messages causing response messages, while some other messages are request messages not needing any accompanying response messages. Since the RLC device cannot determine whether an arbitrary RRC message will cause a response message, when the RRC message is a request message causing a response message, an RRC device sends this indication to the RLC device, and the RLC device uses type-2 polling information only when it receives the indication from the upper layer device, and otherwise, uses type-1 polling information.

When the polling information-responding scheme the RLC device will use during call setup is previously determined, the transmission side transmitting polling information has no need to especially distinguish the polling information type. For example, if an RLC device connected to a TCP-based service is set to use the second polling information-responding scheme, an RLC device transmitting polling information uses normal polling information while an RLC device receiving polling information recognizes all polling information as type-2 polling information. Therefore, the operation shown in FIG. 5 is applied when the polling information-responding scheme to be used individually for each RLC device is not previously determined.

The type-2 polling information use condition can be notified to the RLC device during call setup.

When an RLC device is constructed through a call setup process, the RLC device exchanges RLC PDUs with the opposite RLC device through a predetermined procedure.

Referring back to FIG. 5, in step 510, the RLC device triggers polling as a predetermined condition is satisfied. The polling can be triggered in several conditions, and can be triggered, for example, when the last RLC PDU stored in a transmission buffer is transmitted.

The RLC device determines in step 515 whether there is a high possibility that upper layer data contained in an RLC PDU to be transmitted along with polling information will cause an upper layer response message in the opposite direction. In other words, the RLC device determines if the type-2 polling information use condition is satisfied. If it is determined in step 515 that the type-2 polling information use condition is unsatisfied, the RLC device delivers an RLC PDU containing the type-1 polling information to a lower layer in step 520, like the conventional RLC device, and the lower layer transmits the type-1 polling information and RLC PDU.

However, if it is determined in step 515 that the type-2 polling information use condition is satisfied, the RLC device delivers an RLC PDU containing the type-2 polling information to a lower layer in step 525, and the lower layer transmits the type-2 polling information and RLC PDU.

Figure 6:
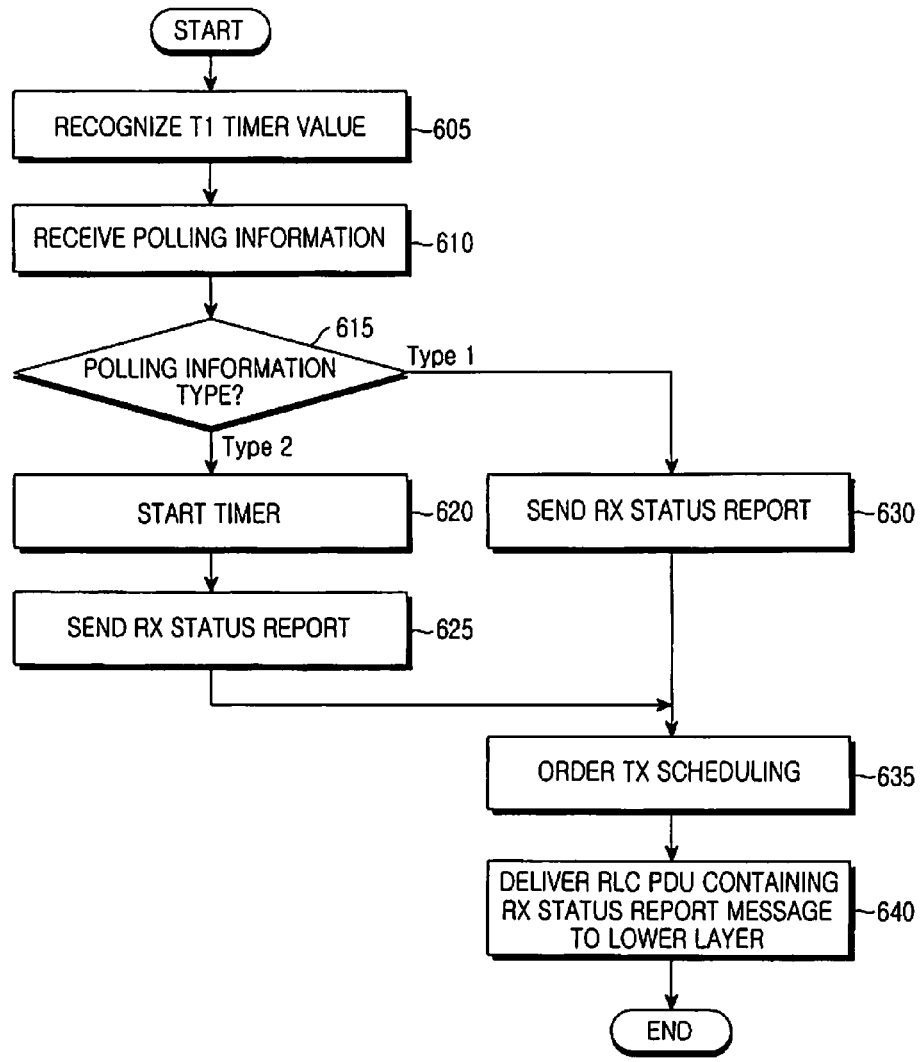
FIG. 6 is a signal flow diagram illustrating an operation of an RLC device for receiving polling information according to the first embodiment of the present invention.

FIG. 6 is a signal flow diagram illustrating an operation of an RLC device for receiving polling information according to the first embodiment of the present invention.

In step 605, an RLC device recognizes a T1 timer value. The T1 timer value should be set to a value corresponding to the L3 processing delay 230, and the network determines the T1 timer value taking into account a characteristic of the call established in the call setup process, and notifies it to the RLC device.

If an RLC device is constructed through the call setup process, the RLC device exchanges RLC PDUs with the opposite RLC device through a predetermined procedure.

If the RLC device receives polling information in step 610, the RLC device proceeds to step 615 where it checks a type of the received polling information. If the received polling information is type-2 polling information, the RLC device proceeds to step 620 where it starts the T1 timer, and then proceeds to step 625, if the T1 timer expires. Otherwise, if upper layer data arrives even before the T1 timer expires, the RLC device can immediately proceeds to step 625. In step 625, the RLC device starts a reception status report transmission process in response to the polling information. In other words, the RLC device notifies the lower layer of a size of the reception status report message. If upper layer data has arrived while the T1 timer runs, a size of the upper layer data is also notified together. The lower layer sends a request for allocation of transmission resources to a scheduler depending on the data size, and if transmission resources are allocated, the lower layer determines a size of the data the RLC device will transmit, based on the allocated transmission resources. At the same time, the lower layer notifies the RLC device of the size of the transmission data. If the RLC device is notified of the size of the transmission data from the lower layer in step 635, the RLC device generates a reception status report and RLC PDU corresponding to the size and delivers it to the lower layer in step 640. The lower layer transmits the RLC PDU and reception status report to the opposite RLC device.

However, if it is determined in step 615 that the received polling information is the type-1 polling information which is equal to the conventional one, the RLC device proceeds to step 630 where it immediately starts a reception status report transmission process without the waiting time set in the T1 timer. That is, the RLC device reports the size of the reception status report message to the lower layer. If the lower layer issues an order to generate and transmit an RLC PDU having a predetermined size in step 635, the RLC device includes a reception status report message in an RLC PDU and delivers it to the lower layer in step 640.

When the polling information-responding scheme the RLC device will use in a call setup process is previously determined, the decision operation of step 615 is not needed, since the RLC device determines the received polling information as polling information corresponding to the predetermined polling information-responding scheme.

In other words, an RLC device predetermined to use the first polling information-responding scheme undergoes steps 605, 610, 630, 635 and 640, while an RLC device predetermined to use the second polling information-responding scheme undergoes steps 605, 610, 620, 625, 635 and 640.

Second Embodiment

A second embodiment of the present invention provides a method and apparatus for, when a reception status report and upper layer data are transmitted together, determining a success/failure in the transmission of the upper layer data transmitted along with the reception status report based on retransmission/non-retransmission of polling information which has caused the reception status report. The use of the second embodiment of the present invention can guarantee reliability of the transmission even without making a separate reception status report on the upper layer data, making it possible to save the transmission resources.

As stated above, the reliability of polling information is guaranteed by the timer-based retransmission technique. An RLC device transmitting polling information starts a polling timer, and retransmits the polling information if it fails to receive a reception status report responsive to the polling information until the timer expires.

Then, an RLC device, which has transmitted a reception status report after receiving the polling information, can determine that the reception status report has been successfully transmitted, if it does not receive again the polling information for a predetermined period. If the RLC device has transmitted the reception status report and upper layer data together, the success/failure in the transmission of the reception status report is coincident with the success/failure in the transmission of the upper layer data. Therefore, by linking retransmission of the upper layer data to retransmission of the reception status report, it is possible to guarantee reliability of the upper layer data even without receiving a separate status report from the opposite RLC device. Although this operation cannot be widely applied since it is limited to the upper layer data transmitted along with a reception status report, it can be usefully used when small-sized upper layer data such as TCP ACK and RRC control response message is transmitted on a temporary basis.

Figure 7:
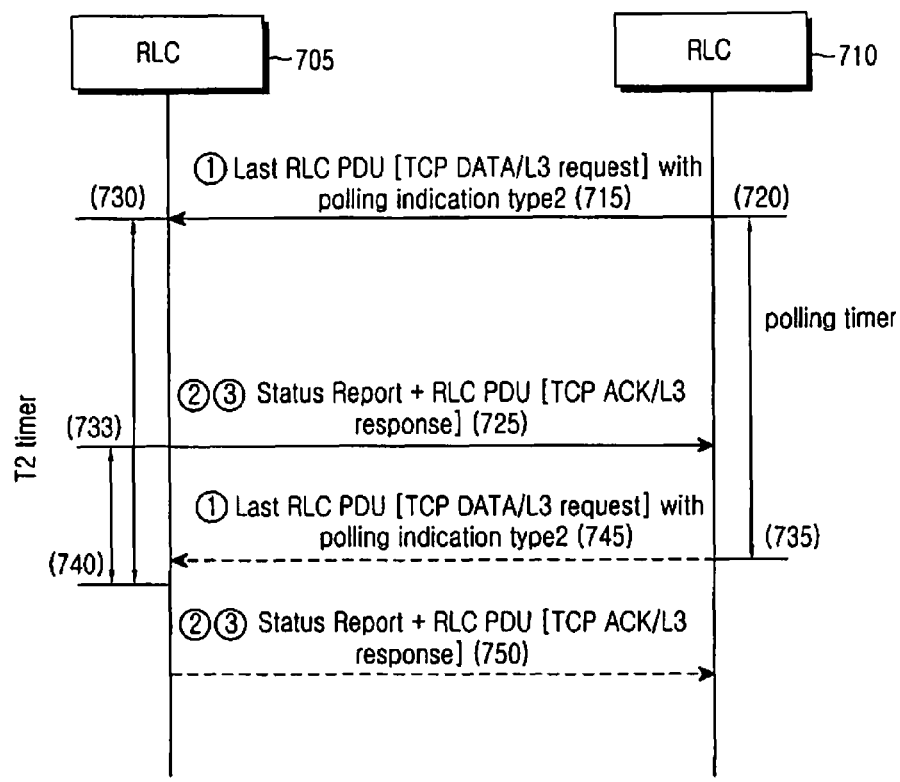
FIG. 7 is a signal flow diagram illustrating an overall operation according to a second embodiment of the present invention.

FIG. 7 is a signal flow diagram illustrating an operation according to the second embodiment of the present invention.

An RLC device 710, which is transmitting data in an arbitrary direction, transmits the last RLC PDU at an arbitrary time. If data contained in the RLC PDU is an arbitrary L3 control request message or TCP segment, the RLC device 710 transmits the RLC PDU along with type-2 polling information in step 715. For simpler realization, a terminal and a base station can previously set a polling type for each radio bearer individually. In this case, an RLC device transmitting polling information has no need to separately indicate the polling type, and transmits the polling information to the opposite RLC device along with the RLC PDU, like the conventional RLC device. The RLC device 710 starts a polling timer (as in Step 720), after the transmission of polling information is completed.

Upon receiving the type-2 polling information and RLC PDU, an RLC device 705 starts a predetermined timer T1 and starts a data transmission procedure after the T1 expires, as done in the first embodiment of the present invention. If upper layer data has arrived while the T1 timer runs, both the reception status report and the upper layer data are included in a buffer status report made through the data transmission procedure. Further, transmission resources are allocated for transmission of the reception status report and upper layer data.

The RLC device 705 transmits a reception status report and an RLC PDU containing upper layer data using the allocated transmission resources in step 725. The upper layer data contained in the RLC PDU can be, for example, TCP ACK or L3 control response message.

The RLC device 705 uses a T2 timer in order to determine the success/failure in transmission of the RLC PDU transmitted along with the reception status report. If polling information, i.e., message #1, is retransmitted in step 745, which caused the reception status report transmitted along with RLC PDU, before the T2 timer expires, the RLC device 705 retransmits the reception status report and RLC PDU, since it means that the transmission of the reception status report and the RLC PDU transmitted along with the reception status report has failed. However, if the polling information, i.e., message #1, is not retransmitted, which caused the reception status report transmitted along with the RLC PDU, until the T2 timer expires, the RLC device discards the RLC PDU from the retransmission buffer, considering that the transmission of the reception status report and the RLC PDU transmitted along with the reception status report is made successfully.

In order to prevent mal-operation of the RLC device, it is necessary to appropriately set the T2 timer value. If the T2 timer expires before the expiration of the polling timer, the RLC device may misrecognize the transmission as a successful transmission, even though the transmission of the reception status report and its associated (coupled) RLC PDU has failed. On the other hand, if the T2 timer expires considerably later than the expiration of the polling timer, the RLC device should unnecessarily store the coupled RLC PDU in its retransmission buffer. Therefore, it is preferable that the expiration of the T2 timer slightly falls behind the expiration of the polling timer, and to this end, a start of the T2 timer needs to be linked with a start of the polling timer. For example, if a start time of the polling timer is a time that the transmission of the polling information is completed, the T2 timer is also started at a time 730 when the RLC device 705 receives the polling information. However, if an RLC device receiving the polling information cannot estimate a start time of the polling timer, the RLC device starts the T2 timer at a time 733 when the transmission of the reception status report and its associated RLC PDU is completed.

As described above, the second embodiment of the present invention determines the success/failure in the transmission of the coupled RLC PDU depending on the success/failure in the transmission of the reception status report, thereby making it possible to guarantee transmission reliability of the RLC PDU even without receiving a separate reception status report on the coupled RLC PDU.

Figure 8:
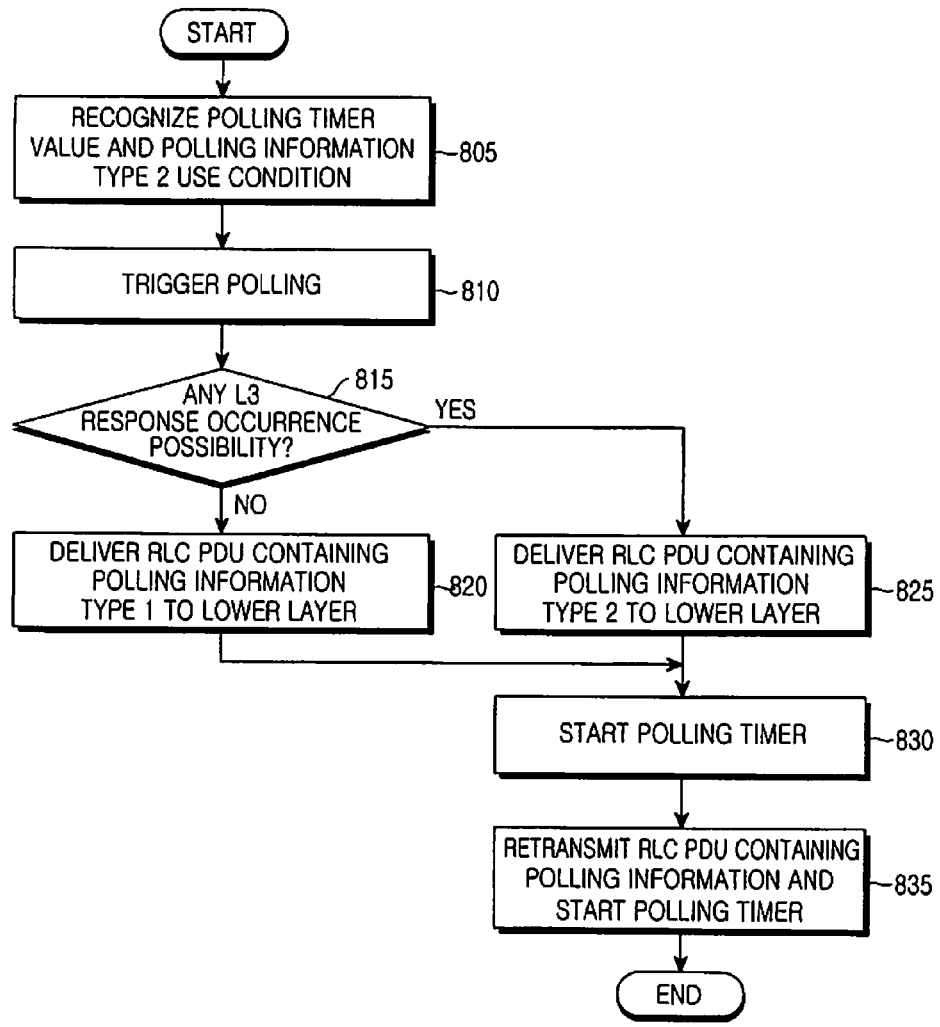
FIG. 8 is a signal flow diagram illustrating an operation of an RLC device for transmitting polling information according to the second embodiment of the present invention.

FIG. 8 is a signal flow diagram illustrating an operation of an RLC device for transmitting polling information according to the second embodiment of the present invention.

Referring to FIG. 8, in step 805, an RLC device recognizes a polling timer value and a use condition of type-2 polling information. The type-2 polling information use condition is equal to that in the first embodiment, so a description thereof will be omitted herein. The polling timer value is for the retransmission of the polling information, and after transmitting the polling information, the RLC device starts the polling timer, and retransmits the polling information if no reception status report responsive to the polling timer is received before the polling timer expires.

The type-2 polling information use condition and polling timer value can be notified to the RLC device during call setup. If an RLC device is constructed through a call setup process, the RLC device exchanges RLC PDUs with the opposite RLC device through a predetermined procedure.

In step 810, the RLC device triggers polling as a predetermined condition is satisfied. There are several possible conditions for triggering the polling, and the polling can be triggered, for example, when the last RLC PDU stored in a transmission buffer is transmitted.

The RLC device determines in step 815 whether there is a possibility that upper layer data contained in an RLC PDU to be transmitted along with polling information will cause an upper layer response message in the opposite direction. In other words, the RLC device determines if the type-2 polling information use condition is satisfied.

If it is determined in step 815 that the type-2 polling information use condition is unsatisfied, the RLC device delivers an RLC PDU containing type-1 polling information to a lower layer and the lower layer transmits the type-1 polling information and RLC PDU in step 820, and then proceeds to step 830.

However, if it is determined in step 815 that the type-2 polling information use condition is satisfied, the RLC device delivers an RLC PDU containing type-2 polling information to a lower layer and the lower layer transmits the type-2 polling information and RLC PDU in step 825, and then proceeds to step 830.

In step 830, the RLC device starts the polling timer, and monitors receipt of a reception status report responsive to the polling information. If no reception status report is received until the timer expires, the RLC device proceeds to step 835 where it retransmits the RLC PDU containing polling information and starts the polling timer. The RLC device repeats the operation of step 835 until a reception status report is received or a predetermined condition is satisfied.

Figure 9:
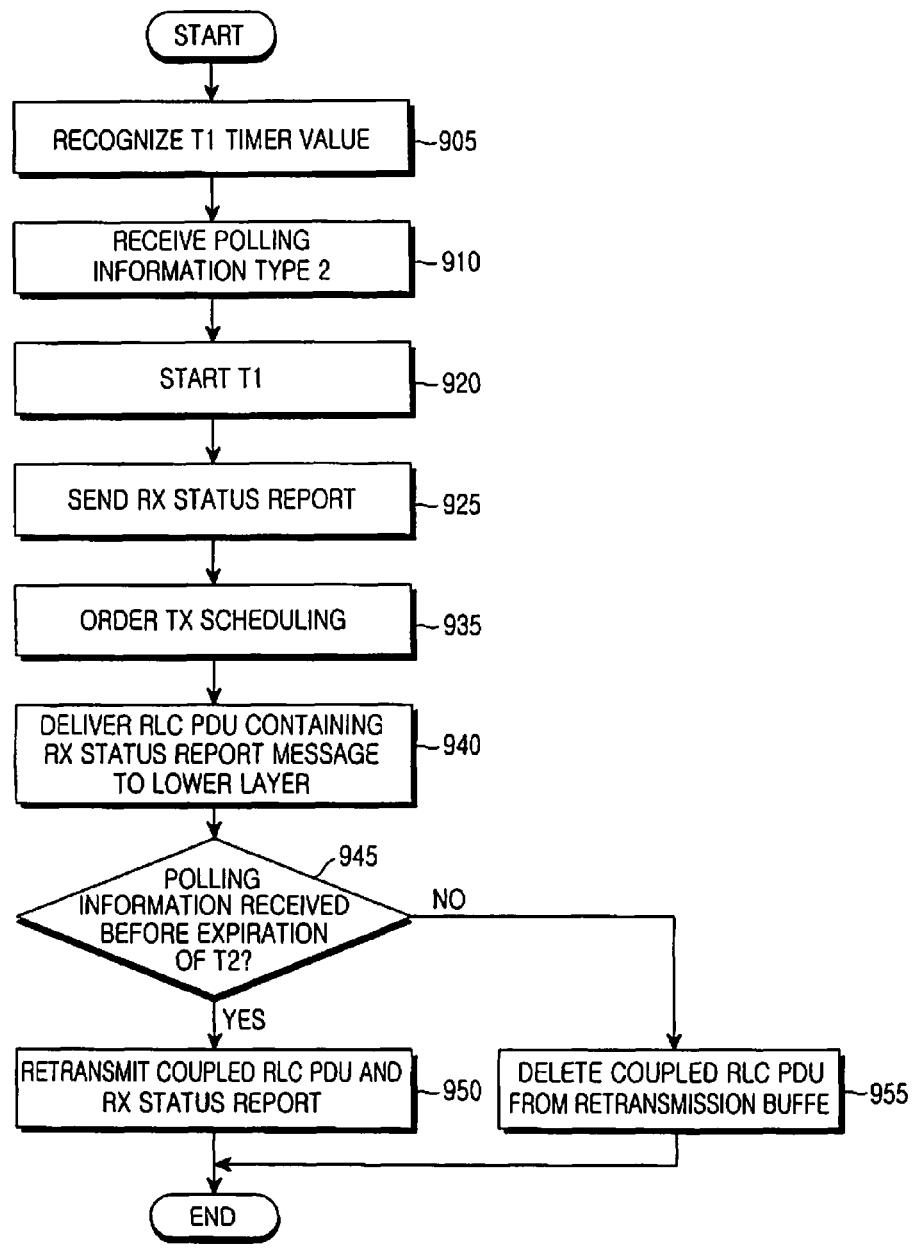
FIG. 9 is a signal flow diagram illustrating an operation of an RLC device for receiving polling information according to the second embodiment of the present invention.

FIG. 9 is a signal flow diagram illustrating an operation of an RLC device for receiving polling information according to the second embodiment of the present invention.

In step 905, an RLC device recognizes a T1 timer value and a T2 timer value. The T1 timer is equal to that in the first embodiment, so a description thereof will be omitted herein. The T2 timer value, as described above, should be set such that it has a slightly longer value than the polling timer on the assumption that the T2 timer and the polling timer are started at the similar time. A call setup control device of the network determines the T1 timer value and the T2 timer value taking a property of the call into consideration during call setup, and sends the timer values to a terminal and a base station, and the terminal and the base station each establish RLC devices and deliver the timer values to the RLC devices.

When an RLC device is constructed through a call setup process, the RLC device exchanges RLC PDUs with the opposite RLC device through a predetermined procedure.

If the RLC device receives type-2 polling information in step 910, the RLC device proceeds to step 920 where it starts the T1 timer and proceeds to step 925 if the T1 timer expires. If upper layer data has arrived even before the T1 timer expires, the RLC device can immediately proceed to step 925.

In step 925, the RLC device starts a reception status report transmission process in response to the polling information. That is, the RLC device notifies the lower layer of a size of the reception status report message. If upper layer data has arrived while the T1 timer runs, the RLC device notifies a size of the upper layer data as well. The lower layer sends a request for allocation of transmission resources to a scheduler depending on the data size. When transmission resources are allocated, the RLC device determines the amount of transmission data based on the allocated transmission resources.

In step 935, the lower layer notifies the RLC device of the amount of transmission data. In step 940, the RLC device generates a reception status report, and if there is upper layer data, generates an RLC PDU with the upper layer data, and then delivers them to the lower layer.

For the sake of convenience, the RLC PDU transmitted along with the reception status report will be referred to herein as a 'coupled RLC PDU'. The lower layer transmits the coupled RLC PDU and reception status report to the opposite RLC device.

In step 945, the RLC device monitors if the polling information which caused the reception status report transmitted along with the coupled RLC PDU is retransmitted before the T2 timer expires.

The T2 timer can be started in step 910 where the RLC device received the type-2 polling information, or can be started at the time that the transmission of the coupled RLC PDU is completed. The situation where the polling information is not retransmitted until the T2 timer expires means that the coupled RLC PDU has been successfully transmitted, while the situation where the polling information is retransmitted means that the transmission of the coupled RLC PDU has failed.

The followings are methods for determining if arbitrary polling information is polling information that has caused the reception status report transmitted along with the coupled RLC PDU.

If polling information is transmitted after being included in an RLC PDU, a sequence number of the RLC PDU can be used as an identifier of the polling information. That is, if a sequence number of an RLC PDU in which polling information received at an arbitrary time is included is identical to a sequence number of an RLC PDU in which previously received polling information is included, it means that the polling information is the same and it can be determined that the presently received polling information is the retransmitted information of the previously received polling information.

For simple realization, all type-2 polling information received before a T2 timer expires can be regarded as retransmitted information of type-2 polling information which has caused a start of the T2 timer.

Referring back to FIG. 9, if it is determined in step 945 that transmission of the reception status report and coupled RLC PDU has failed, the RLC device retransmits the coupled RLC PDU and reception status report in step 950. In this case, a reception status report updated with reception status information at the corresponding time can be retransmitted.

However, if it is determined in step 945 that the transmission of the reception status report and coupled RLC PDU is made successfully, the RLC device deletes the coupled RLC PDU from a retransmission buffer in step 955, and then ends the procedure.

Figure 10:
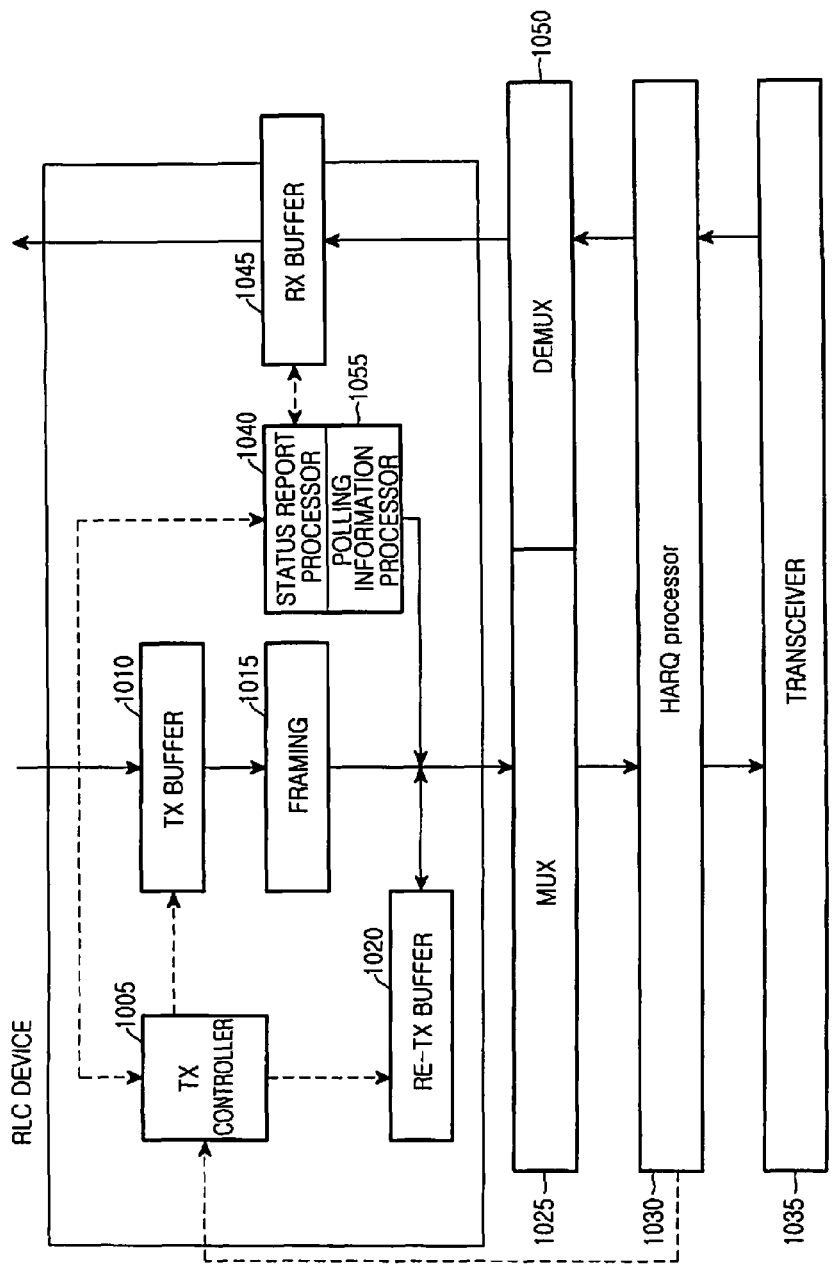
FIG. 10 is a block diagram illustrating an internal structure of an RLC device according to an embodiment of the present invention.

FIG. 10 is a block diagram illustrating an internal structure of an RLC device according to an embodiment of the present invention.

Referring to FIG. 10, an RLC device 1000 includes a transmission controller 1005, a transmission buffer 1010, a framing unit 1015, a retransmission buffer 1020, a reception status report processor 1040, a reception buffer 1045, and a polling information processor 1055.

The RLC device is connected to a multiplexer 1025 and a demultiplexer 1050. The multiplexer 1025 multiplexes RLC PDUs provided from multiple RLC devices into one Hybrid ARQ (HARQ) packet. The demultiplexer 1050 demultiplexes an HARQ packet provided from an HARQ processor, and delivers the results to a proper RLC device.

An HARQ processor 1030 is a device for transmitting/receiving HARQ packets through a predetermined HARQ operation, and a transceiver 1035 is a device for modulating HARQ packets into a radio transmission signal and demodulating a received radio signal.

A detailed description will now be made of an operation of the RLC device 1000. Data provided from an upper layer is stored in the transmission buffer 1010, and later framed into an RLC PDU with a proper size under the control of the transmission controller 1005. The transmission controller 1005 reports the amount of desired transmission data to the lower layer, receives from the lower layer a notification indicating the amount of data the lower layer will transmit in the next transmission period, and determines the data it will transmit in the next transmission period according to the amount of transmission data.

The amount of desired transmission data is determined by taking into account all of (i) the amount of data stored in the transmission buffer 1010, (ii) the amount of data stored in the retransmission buffer 1020, and (iii) a size of other control information such as a reception status report.

The transmission controller 1005 starts a T1 timer upon receipt of type-2 polling information, and if the T1 timer expires, controls the reception status report processor 1040 so as to generate a reception status report. When transmission of the reception status report and coupled RLC PDU is completed, the transmission controller 1005 starts a T2 timer. If no type-2 polling information is received until the T2 timer expires, the transmission controller 1005 removes coupled RLC PDU from the retransmission buffer 1020, determining that the transmission of the coupled RLC PDU is made successfully. If type-2 polling information is received before the T2 timer expires, the transmission controller 1005, determining that the transmission of the coupled RLC PDU and reception status report has failed, controls the reception status report processor 1040 to generate a new reception status report and retransmits the reception status report and coupled RLC PDU.

The framing unit 1015 makes an RLC PDU by attaching an RLC header to the data provided from the transmission buffer 1010. The RLC PDU is delivered to the multiplexer 1025 and stored in the retransmission buffer 1020, and the RLC PDU stored in the retransmission buffer 1020 is retransmitted at the request of the opposite RLC device, or removed when it is determined that the corresponding RLC PDU has been successfully transmitted.

The polling information processor 1055 includes polling information in an RLC PDU before transmission if a predetermined condition is satisfied. Also, the polling information processor 1055 recognizes a type-2 polling information triggering condition, transmits type-2 polling information when the condition is satisfied, and transmits type-1 polling information when the condition is not satisfied. Upon receipt of polling information, the polling information processor 1055 notifies it to the transmission controller 1005.

An RLC PDU provided from the demultiplexer 1050 is stored in the reception buffer 1045, and the reception status report processor 1040, if a predetermined status report generation condition is satisfied, reports to the transmission controller 1005 that it should transmit a status report. If the transmission controller 1005 issues a status report transmission order, the reception status report processor 1040 checks sequence numbers of RLC PDUs stored in the reception buffer 1045, recognizes successfully received RLC PDUs and sequence numbers of retransmission-requested RLC PDUs, generates a reception status report according thereto, and transmits the generated reception status report.

In a third embodiment, the transmission controller manages retransmission of polling information. If there is a need for retransmission of the polling information due to the expiration of a polling timer, the transmission controller controls the retransmission buffer and the framing unit so as to resegment a polling PDU stored in the retransmission buffer using a predetermined method, and to newly generate a polling PDU containing the polling information and only the minimum user data. The polling PDU containing the polling information and only the minimum user data is transmitted by way of the multiplexer, the HARQ processor, and the transceiver. If there is a need for retransmission of the polling PDU for a reason other than the expiration of the polling timer, for example, due to a transmission failure for the polling PDU in an HARQ level, the transmission controller controls the retransmission buffer so as to retransmit the polling PDU stored in the retransmission buffer according to the original retransmission procedure. In other words, if transmission resources, the amount of which is sufficient for retransmission of the original polling PDU, are available at this moment, the transmission controller retransmits the polling PDU as it is, and if the transmission resources are insufficient, the transmission controller resegments the polling PDU in a transmittable size before transmission.

In a fourth embodiment, the transmission controller manages retransmission of polling information. If there is a need for resegmented retransmission of a polling PDU, the transmission controller checks a trigger of the polling information, and controls the polling information processor according to the trigger so that the polling information is included in the first segment or the last segment.

In a fifth embodiment, the transmission controller manages retransmission of polling information. The transmission controller starts a predetermined polling timer at the time it first receives a packet from the opposite RLC device after a lapse of a time of T3 after a polling PDU was successfully transmitted. If no reception status report message is received until the polling timer expires, the transmission controller starts a retransmission procedure of polling information.

Third Embodiment

The third embodiment of the present invention provides a method for retransmitting an RLC PDU containing polling information in such a manner that the method retransmits the RLC PDU along with the polling information when there is a high possibility that the RLC PDU containing polling information might be lost, and the method retransmits only the polling information when, even though the RLC PDU containing polling information was normally transmitted, there is a high possibility that a reception status report message might be lost. More specifically, in retransmission due to HARQ transmission failure for the RLC PDU containing polling information, the method retransmits the entire RLC PDU containing polling information, and when retransmission is needed because even though the HARQ transmission for the RLC PDU containing polling information was made successfully, no reception status report is received until the polling timer expires, the method retransmits only the polling information.

Figure 11:
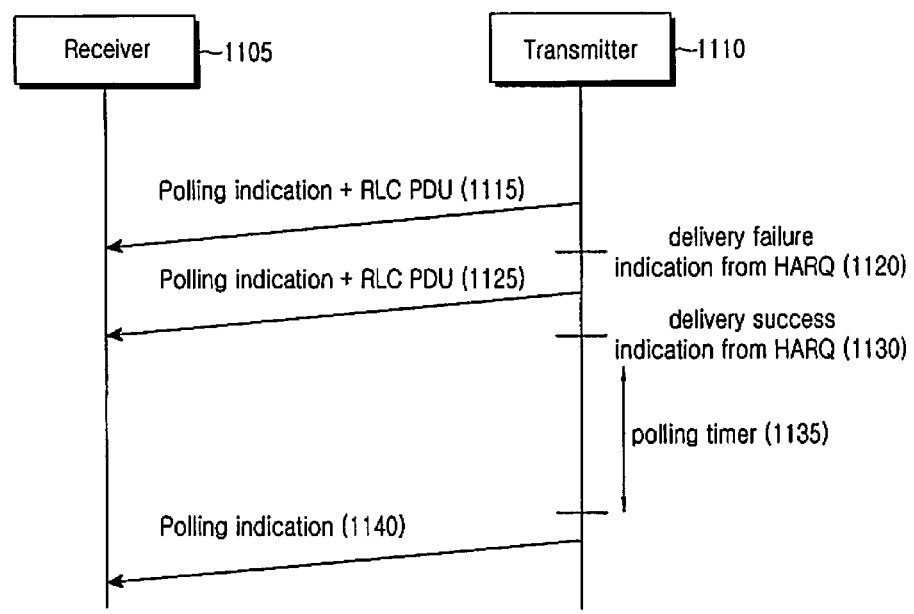
FIG. 11 is a signal flow diagram illustrating an overall operation according to a third embodiment of the present invention.

FIG. 11 is a signal flow diagram illustrating an overall operation according to the third embodiment of the present invention.

In a mobile communication system including a device 1110 for transmitting polling information (hereinafter referred to as a 'transmitter') and a device 1105 for receiving polling information (hereinafter referred to as a 'receiver'), the transmitter 1110 transmits an RLC PDU containing polling information if a predetermined condition is satisfied. A condition of generating polling information is called a 'polling information generation condition' (or 'polling triggering condition'), and a definition thereof is given as follows, by way of example.

The polling triggering condition can be satisfied when:
  the last data is transmitted, which is stored in a transmission buffer or a retransmission buffer (First Triggering Condition);
  a predetermined timer, which was started after transmission of polling information, expires (Second Triggering Condition); and
  the amount of outstanding RLC PDU stored in the retransmission buffer exceeds a predetermined ratio of the total buffer size to the amount of outstanding RLC PDU (Third Triggering Condition).

Among the RLC PDUs being transmitted to the opposite RLC device, an RLC PDU, successful transmission of which is not yet checked, i.e., an RLC PDU for which no positive acknowledgement (ACK) is received from the opposite RLC device, is called an 'outstanding RLC PDU'.

The triggering condition can be differently set for each RLC device. For example, an arbitrary RLC device can be set to respond to only the first triggering condition, while other RLC devices can be set to respond to the first and third triggering conditions.

If the polling triggering condition is satisfied, the transmitter generates an RLC PDU by concatenating an RLC header to a payload, and delivers the RLC PDU to a lower layer. The payload contains user data and/or RLC control information provided from an upper layer. The polling information can be defined as a particular field of the RLC header, or can be defined as separate RLC control information. An RLC PDU containing polling information is defined as a polling PDU regardless of how the polling information is defined. Upon receiving the RLC PDU, the lower layer transmits RLC PDU through a predetermined HARQ operation. According to the property of the HARQ operation, the lower layer can relatively correctly recognize the success/failure in transmission of the RLC PDU.

The HARQ operation performs an ARQ operation in which an HARQ transmitting side and an HARQ receiving side are simplified, and if an HARQ transmitter has received a positive acknowledgement in an HARQ level (hereinafter referred to as 'HARQ ACK') for a packet containing a particular RLC PDU, the HARQ transmitter can determine that the corresponding RLC PDU has been successfully transmitted. If the HARQ transmitter has failed to receive HARQ ACK for the packet containing RLC PDU despite of a predetermined number of retransmissions, the HARQ transmitter can determine that the transmission of the corresponding RLC PDU has failed. The HARQ ACK or HARQ negative acknowledgement (NACK) is subject to distortion during transmission/reception, and in this case, the HARQ device cannot correctly determine the success/failure in transmission. In other words, unless the HARQ ACK signal or the HARQ NACK signal is distorted, the HARQ device can correctly determine the success/failure in transmission of a particular packet. Generally, in the radio channel environment, a probability that an HARQ NACK signal will be distorted into an HARQ ACK signal is about 10 e–3~10 e–4. In other words, a probability that a packet, whose transmission is determined to be successful in the HARQ level, would not be successfully transmitted in actuality is about 10 e–3~10 e–4. A probability that despite of a predetermined number of retransmissions, no HARQ ACK has occurred for an arbitrary HARQ packet is about 10 e–2. For the sake of convenience, the situation where even though an arbitrary packet has been retransmitted a predetermined number of times, no HARQ ACK is received for the packet is referred to as 'transmission of the packet in the HARQ level is failed'.

If a lower layer performing HARQ transmission has failed in transmission of a packet in which a polling RLC PDU 1115 containing polling information is included, the lower layer notifies the transmission failure for the RLC PDU to the transmitter (as in Step 1120).

Upon receiving the notification indicating the transmission failure for the polling RLC PDU from the lower layer, the transmitter retransmits the entire polling PDU (as in Step 1125), determining that the RLC PDU containing polling information is totally lost.

If the transmission in the HARQ level for the retransmitted packet containing polling RLC PDU is made successfully, the lower layer notifies the transmitter of the success in transmission of the RLC PDU (as in Step 1130). After receiving the notification indicating the transmission success, the transmitter starts a polling timer at an arbitrary time (as in Step 1135), and performs retransmission of the polling information if it fails to receive a reception status report until the polling timer expires. As stated above, a probability that even though the HARQ device has determined that the transmission of polling PDU was made successfully, the polling PDU would not be successfully transmitted in actuality is about 10 e–3~10 e–4. However, a probability that the transmission of the status report message would be failed is about 10 e–2. In other words, the loss probability of the status report message is much greater than the loss probability of the polling PDU. In this situation, therefore, the transmitter retransmits only the polling information (as in Step 1140), rather than retransmitting the entire polling PDU.

Figure 12:
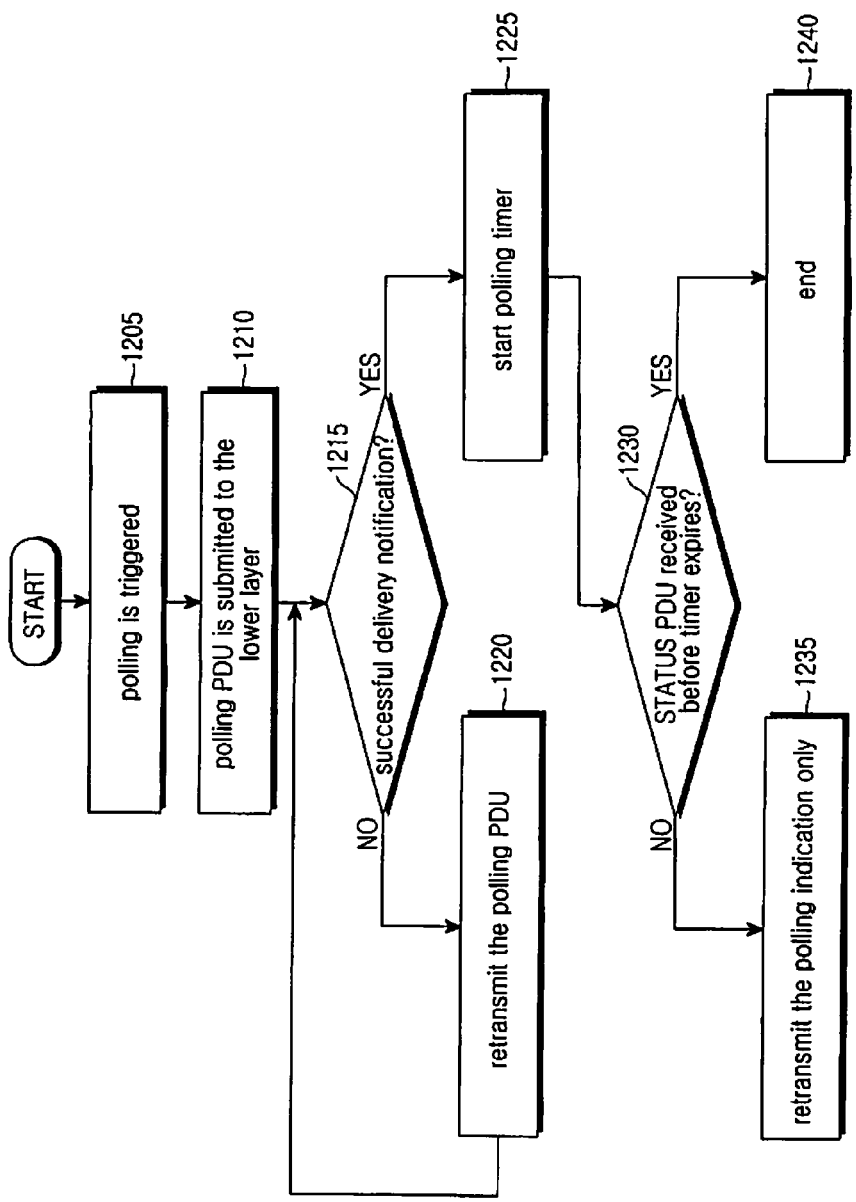
FIG. 12 is a flowchart illustrating an operation of a transmitter according to the third embodiment of the present invention.

FIG. 12 is a flowchart illustrating an operation of a transmitter.

If the foregoing polling triggering condition is satisfied in step 1205, a transmitter generates an RLC PDU containing polling information and delivers it to a lower layer in step 1210. The RLC PDU is composed of a header and a payload, and the polling information can be contained in a predetermined header field, or can be contained in a payload as a separate RLC control message. Also, a part of an RLC PDU which is user data provided from an upper layer is contained in the payload. The transmitter determines in step 1215 if the RLC PDU containing polling information has been successfully transmitted in an HARQ level. If an HARQ ACK is received for a packet in which the RLC PDU containing polling information is included, it means that the RLC PDU has been successfully transmitted in the HARQ level, and if the transmitter has failed to receive HARQ ACK even though it has transmitted and retransmitted the packet including the RLC PDU containing polling information a predetermined number of times, it means that the RLC PDU containing polling information has failed in the transmission in the HARQ level. If the RLC PDU containing polling information has been successfully transmitted in the HARQ level, the transmitter proceeds to step 1225, and if the RLC PDU containing polling information has failed in transmission in the HARQ level, the transmitter proceeds to step 1220.

In step 1220, the transmitter performs retransmission on the RLC PDU containing polling information. That is, the transmitter delivers the RLC PDU containing polling information back to the lower layer, and then returns to step 1215 where the transmitter determines whether the RLC PDU has been successfully transmitted in the HARQ level.

If the RLC PDU containing polling information has been successfully transmitted in the HARQ level, the transmitter proceeds to step 1225 where it starts a polling timer. In step 1230, the transmitter determines if a reception status report is received before the polling timer expires. If no reception status report is received until the polling timer expires, the transmitter proceeds to step 1235. Proceeding to step 1230 means that the polling PDU, which has been successfully transmitted in the HARQ level, has failed in transmission in reality due to distortion of the HARQ feedback information, or the transmission of the reception status report message responsive to the polling information has failed. Since the transmission failure probability due to the distortion of the HARQ feedback information is much less than the transmission failure probability of the reception status report message as described above, the transmitter determines that the transmission of the reception status report message has failed. The terminal, determining that the polling PDU has been successfully transmitted, retransmits only the polling information without retransmitting the user data included in the payload of the polling PDU.

If the polling information is defined as a separate RLC control message, it is naturally possible to retransmit only the polling information without retransmitting the user data. However, if the polling information is defined as a predetermined field of the RLC header, the transmitter performs resegmented retransmission separately only on the last byte in the payload of the RLC PDU containing polling information, or performs resegmented retransmission only on the RLC header without including the payload. The term 'resegmented retransmission' refers to an operation of resegmenting and retransmitting only a part of the RLC PDU when the terminal cannot retransmit the entire RLC PDU as transmission resources allocated to the terminal are insufficient at the time the retransmission of the particular RLC PDU is needed. However, since there is a high probability that the polling PDU has been successfully transmitted, it is possible to minimize the amount of user data transmitted along with the polling information, by using the resegmented retransmission technique even when it is necessary to retransmit only the polling information.

Figure 13:
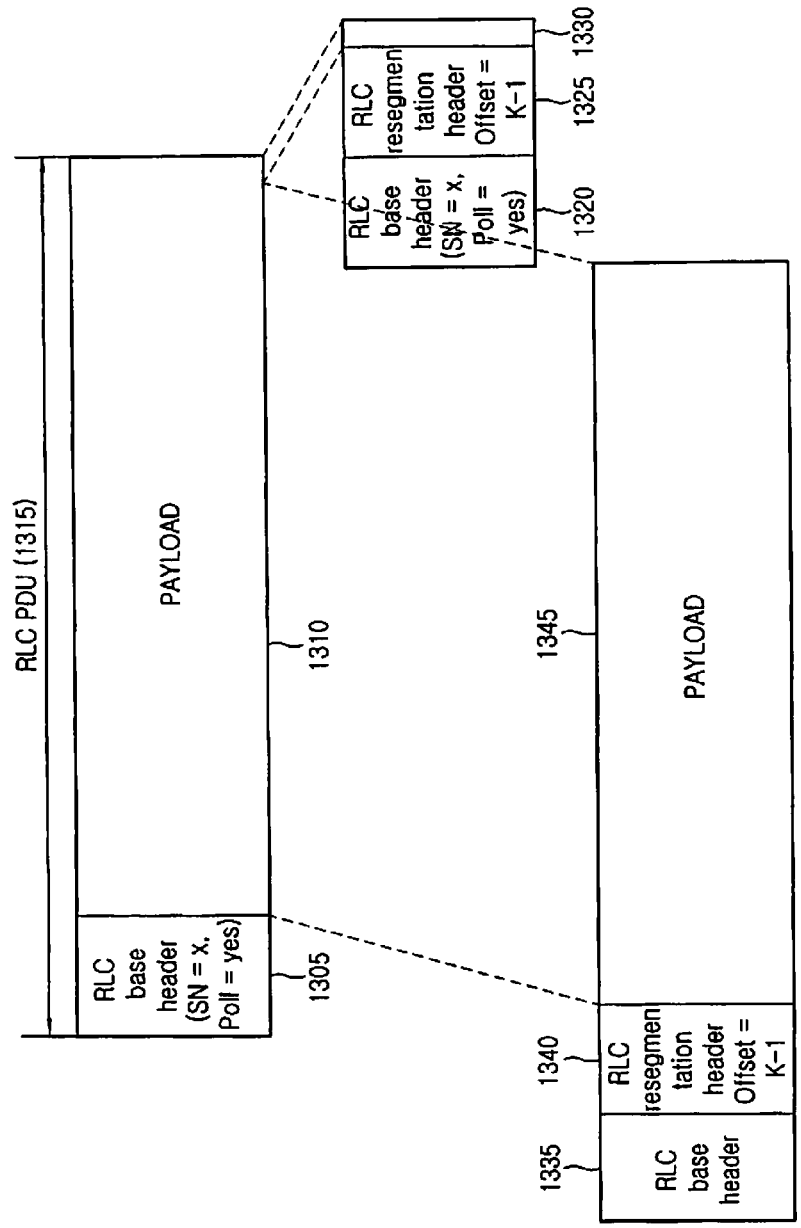
FIG. 13 is a diagram illustrating a method for performing resegmented retransmission on a polling PDU so that polling information and only the minimum user data are included.

More specifically, referring to FIG. 13, lets it is assumed that a sequence number of a header in an RLC PDU 1315 composed of an RLC header 1305 and a payload 1310 is set as 'x' and a poll bit is set as 'yes' before being transmitted. If the RLC PDU has been successfully transmitted in the HARQ level but should be retransmitted as no reception status report is received before the polling timer expires, the transmitter resegments and retransmits only the last byte 1330 in the payload of the RLC PDU. That is, the transmitter includes the last byte in the payload part, inserts the same sequence number x as that of the original RLC PDU into the RLC header, and sets the poll bit as 'yes'. The PDU is a PDU which is subject to resegmented retransmission, and a resegmentation header 1325 is inserted therein so that the PDU can later be reassembled into the original PDU. Offset information indicating a position of the payload undergoing resegmented retransmission in the original payload is included in the resegmentation header, and information indicating that the payload undergoing resegmented retransmission is the last byte of the original payload is included in the offset information. For example, if the full size of the original payload is assumed to be K bytes, [K−1] is contained in the offset. Further, the transmitter sets a flag Last_Segment_Flag indicating the last segment as 'yes'. Alternatively, it is also possible to never include user data in the RLC PDU undergoing resegmented retransmission. In generating an RLC PDU including no payload, the transmitter inserts the same sequence number x as that of the original RLC PDU into a header of the RLC PDU, and sets the poll bit as 'yes'. In addition, the transmitter includes a payload size K of the original PDU in an offset field of the resegmentation header of the RLC PDU, and sets the flag indicating the last segment as 'yes'. The use of the resegmented retransmission technique can minimize the amount of user data retransmitted along with the polling information.

Upon receiving a reception status report before the polling timer expires, the transmitter ends the polling information transmission process.

Fourth Embodiment

The fourth embodiment of the present invention provides a method for including polling information in different segments according to a triggering condition of a polling PDU during resegmented retransmission of the polling PDU. The term 'resegmented retransmission' means an operation of resegmenting a particular RLC PDU into several segments and retransmitting the segments. The resegmented retransmission is implemented when it is not possible to transmit the original RLC PDU as it is, because, for example, a channel condition of a terminal is poor or the amount of generated traffic increases at a retransmission time. If polling information was contained in the original RLC PDU, it is desirable to include polling information even in the RLC PDU undergoing retransmission. However, since including polling information in all segments undergoing resegmented retransmission may cause the more-than-necessary reception status report messages, it is preferable to include polling information only in some of the segments undergoing resegmented retransmission.

The fourth embodiment of the present invention includes polling information in the segment that can best satisfy a purpose of the polling information, according to the causes of generating the polling information.

As described above, the polling triggering condition can be satisfied when:
  the last data is transmitted, which is stored in a transmission buffer or a retransmission buffer (hereinafter referred to as 'last RLC PDU trigger');
  a predetermined timer, which was started after transmission of polling information, expires (hereinafter referred to as 'periodic trigger'); and the amount of outstanding RLC PDU stored in the retransmission buffer exceeds a predetermined ratio of the total buffer size to the amount of outstanding RLC PDU (hereinafter referred to as 'window trigger').

Figure 14:
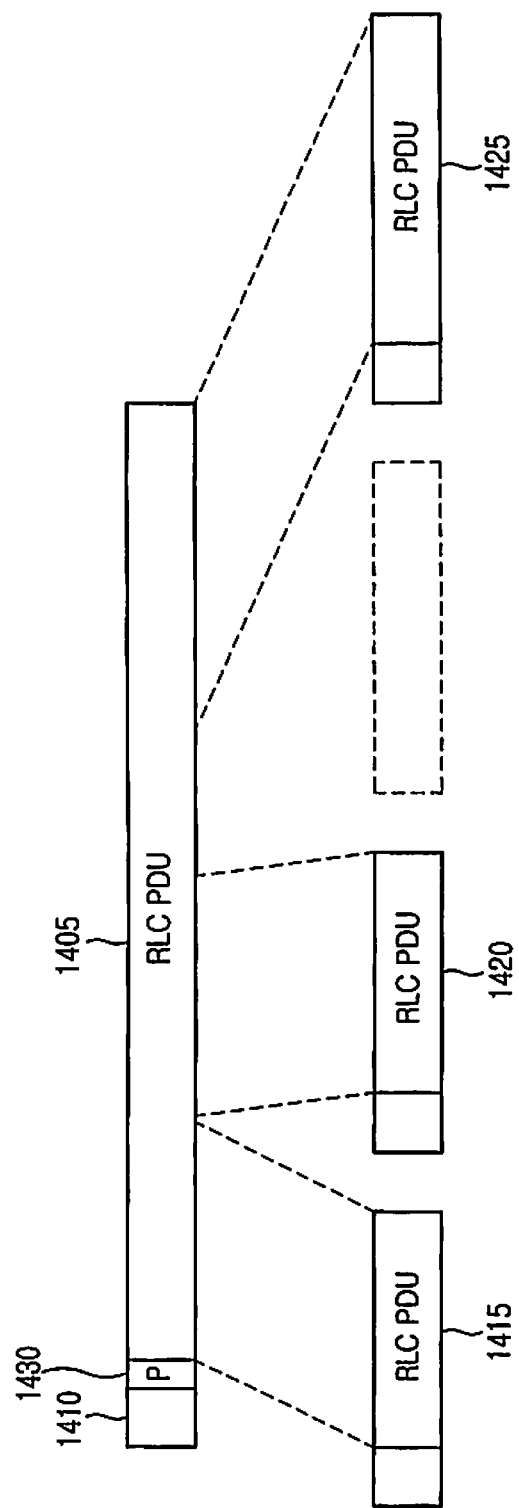
FIG. 14 is a diagram illustrating resegmented retransmission of a polling PDU.

As an example shown in FIG. 14, it is assumed that transmission of an RLC PDU 1405 containing polling information 1430 has failed, and the RLC PDU 1405 is subject to resegmented retransmission after resegmented into multiple RLC PDUs 1415, 1420 and 1425.

If the polling information is generated by the last RLC PDU trigger, a purpose of the polling information is that a transmitter receives a reception status report for reception status of all RLC PDUs, including the last RLC PDU. Therefore, when an RLC PDU containing the polling information caused by the last RLC PDU trigger undergoes resegmented retransmission, the polling information should be included in the last segment 1425 to best meet the purpose of the polling information.

However, if the polling information is caused by the periodic trigger, a purpose of the polling information is that the transmitter periodically receives a reception status report. Since the situation where an RLC PDU containing the polling information should undergo retransmission means that the transmitter has failed to receive a reception status report at its first intended time, it is preferable to retransmit the polling information as soon as possible. Therefore, when the RLC PDU containing the polling information caused by the periodic trigger is subject to resegmented retransmission, the polling information is contained in the first segment 1415.

If the polling information is caused by the window trigger, a purpose of the polling information is to prevent overflow of the transmission buffer. In sum, the purpose of the window trigger means that when overflow of the transmission buffer is expected within a short time as the amount of data stored in the transmission buffer exceeds a predetermined ratio, the transmitter discards from its transmission buffer the RLC PDUs that a receiver has successfully received, depending on a received reception status report. Therefore, if the transmitter has failed to receive a reception status report message responsive to the polling information caused by the window trigger, the transmitter needs to rapidly retransmit the polling information to rapidly receive a new reception status report. Thus, when the RLC PDU containing the polling information caused by the window trigger is subject to resegmented retransmission, the transmitter includes the polling information in the first segment 1415.

Figure 15:
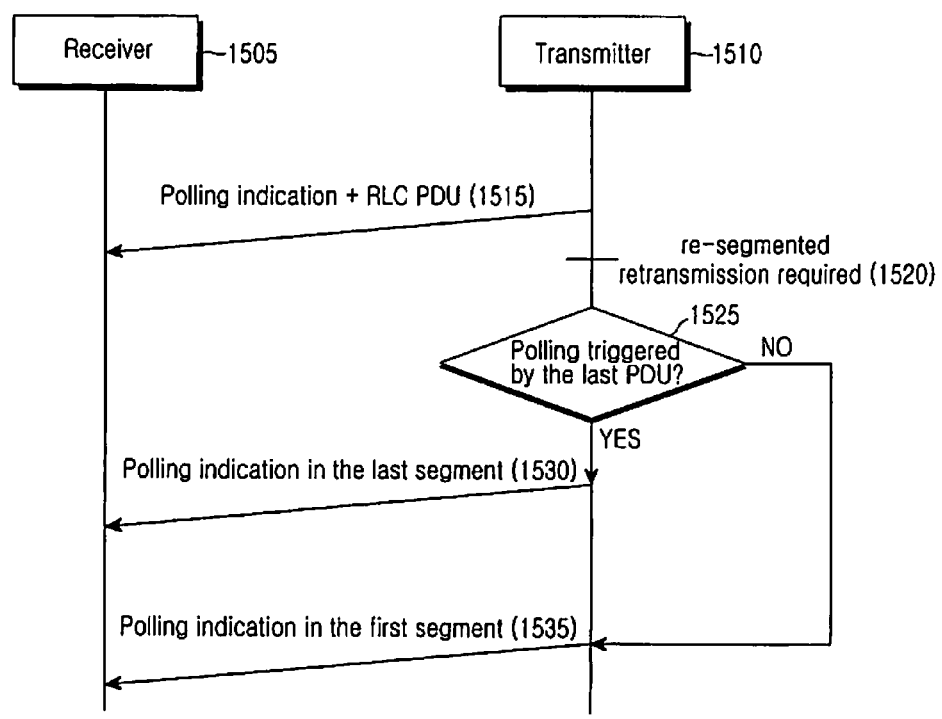
FIG. 15 is an overall signal flow diagram according to a fourth embodiment of the present invention.

FIG. 15 is an overall signal flow diagram according to the fourth embodiment of the present invention.

In a mobile communication system including a receiver 1505 and a transmitter 1510, the transmitter transmits an RLC PDU containing polling information (as in Step 1515) if a polling triggering condition is satisfied. An occasion where the transmitter should perform resegmented retransmission on the RLC PDU may happen (as in Step 1520), when the amount of transmission resources allocated to the transmitter is insufficient even though the transmitter should retransmit the RLC PDU, because (i) it has received an HARQ NACK signal for the RLC PDU, (ii) it has failed in the transmission of the RLC PDU in an HARQ level, or (iii) it has failed to receive a reception status report until a polling timer expires.

The terminal (or transmitter) checks a condition which has generated the polling information of the RLC PDU that should undergo resegmented retransmission, and if it is determined that the polling information was caused by the last RLC PDU trigger, the transmitter includes the polling information in the last segment of the RLC PDU before transmission (as in Step 1530). If the polling information of the RLC PDU undergoing resegmented retransmission is caused by the periodic trigger or the window trigger, the transmitter includes the polling information in the first segment of the RLC PDU before transmission (as in Step 1535).

Figure 16:
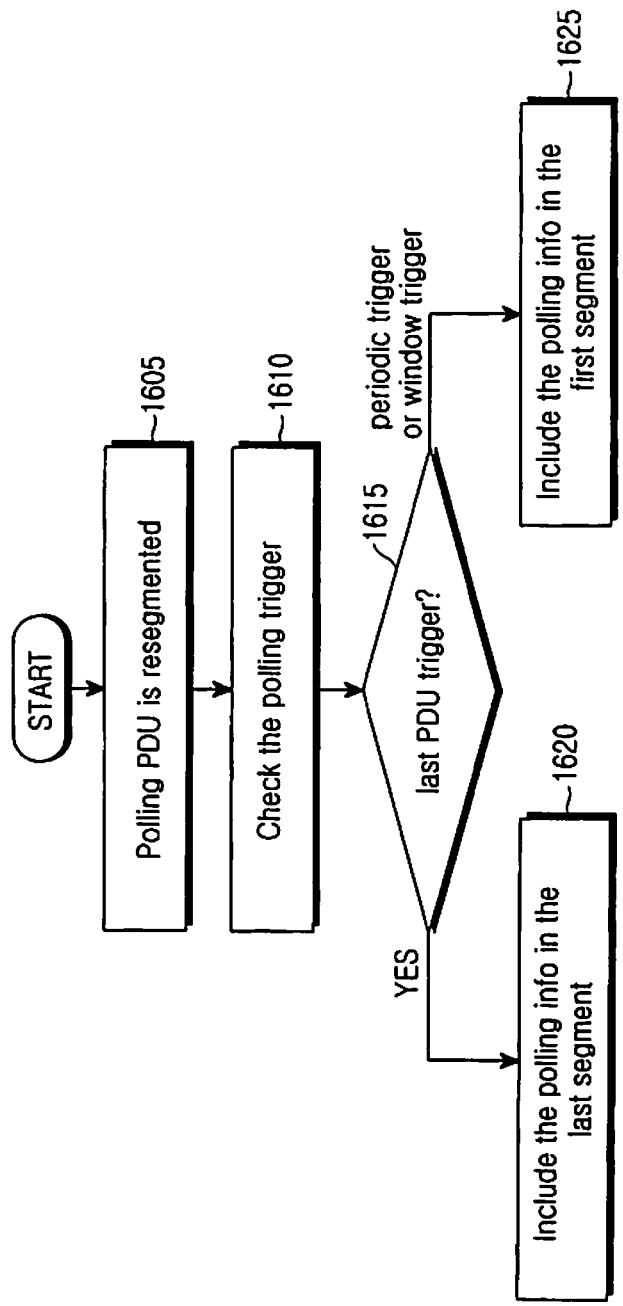
FIG. 16 is a flowchart illustrating an operation of a transmitter according to the fourth embodiment of the present invention.

FIG. 16 is a flowchart illustrating an operation of a transmitter according to the fourth embodiment of the present invention.

In step 1605, a need occurs for resegmented retransmission of an RLC PDU containing polling information. In step 1610, the transmitter checks a trigger of the polling information included in the RLC PDU which is subject to resegmented retransmission. That is, the transmitter checks by which polling triggering condition the polling information was caused.

The transmitter checks in step 1615 if the trigger of the polling information is the last PDU trigger, and if the trigger is the last PDU trigger, the transmitter proceeds to step 1620. However, if the trigger is the periodic trigger or the window trigger other than the last PDU trigger, the transmitter proceeds to step 1625.

In step 1620, the transmitter performs resegmented retransmission on the RLC PDU in such a manner that it includes polling information in the last segment and starts a polling timer if the last segment is successfully transmitted.

In step 1625, the transmitter performs resegmented retransmission on the RLC PDU in such a manner that it includes polling information in the first segment and starts the polling timer if the first segment is successfully transmitted.

Fifth Embodiment

The fifth embodiment of the present invention provides a method and apparatus for starting a polling timer at the time that the first packet is received from the opposite RLC device after transmitting a polling PDU. The polling timer is generally started when the polling PDU is successfully transmitted.

Figure 17:
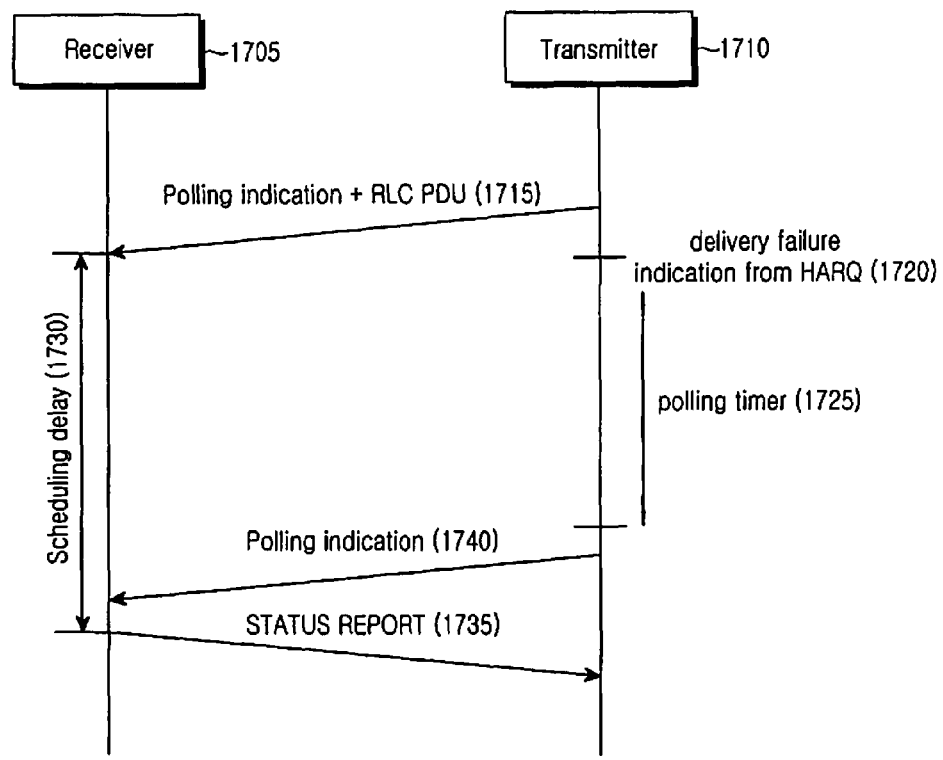
FIG. 17 is an overall signal flow diagram according to a fifth embodiment of the present invention.

FIG. 17 is an overall signal flow diagram according to the fifth embodiment of the present invention.

Referring to FIG. 17, if a lower layer notifies that a packet containing a polling PDU has been successfully transmitted (as in Step 1720), a transmitter starts a polling timer, and retransmits the polling information (as in Step 1740) if the transmitter receives no reception status report before the polling timer expires.

In the mobile communication system to which base station-based scheduling is applied, like in LTE, even though a receiver has normally received a polling PDU, the receiver cannot immediately transmit a reception status report message. The receiver should be allocated, from a scheduler, transmission resources over which it will transmit the reception status report, and if a logical channel to which the receiver belongs has a low priority, a scheduling delay 1730, which is a delay occurring when the transmission resources are allocated, can have a very large value. The scheduler performs scheduling taking into account the amount of data and the priority of the data at an arbitrary time, and generally allocates transmission resources first to the high-priority data. If the amount of transmission data is not so great at an arbitrary time, transmission resources can be allocated even to the low-priority data with a short time. However, if the amount of transmission data is great, a long time may be required for allocating transmission resources to the low-priority data. Since the scheduling delay suffers a considerable change in this way, it is almost impossible to previously estimate its value.

The receiver transmits a reception status report message (as in Step 1735) only after suffering the scheduling delay, and if the polling timer is set shorter than the scheduling delay, the polling information may be unnecessarily retransmitted (as in Step 1740).

Since the situation where an RLC device of an arbitrary logical channel has received a packet from the opposite RLC device after transmitting polling information means that transmission resources have been allocated to the opposite RLC device as the scheduling delay has elapsed, in the fifth embodiment of the present invention, the RLC device starts the polling timer after it receives the first RLC PDU from the opposite RLC device.

Figure 18:
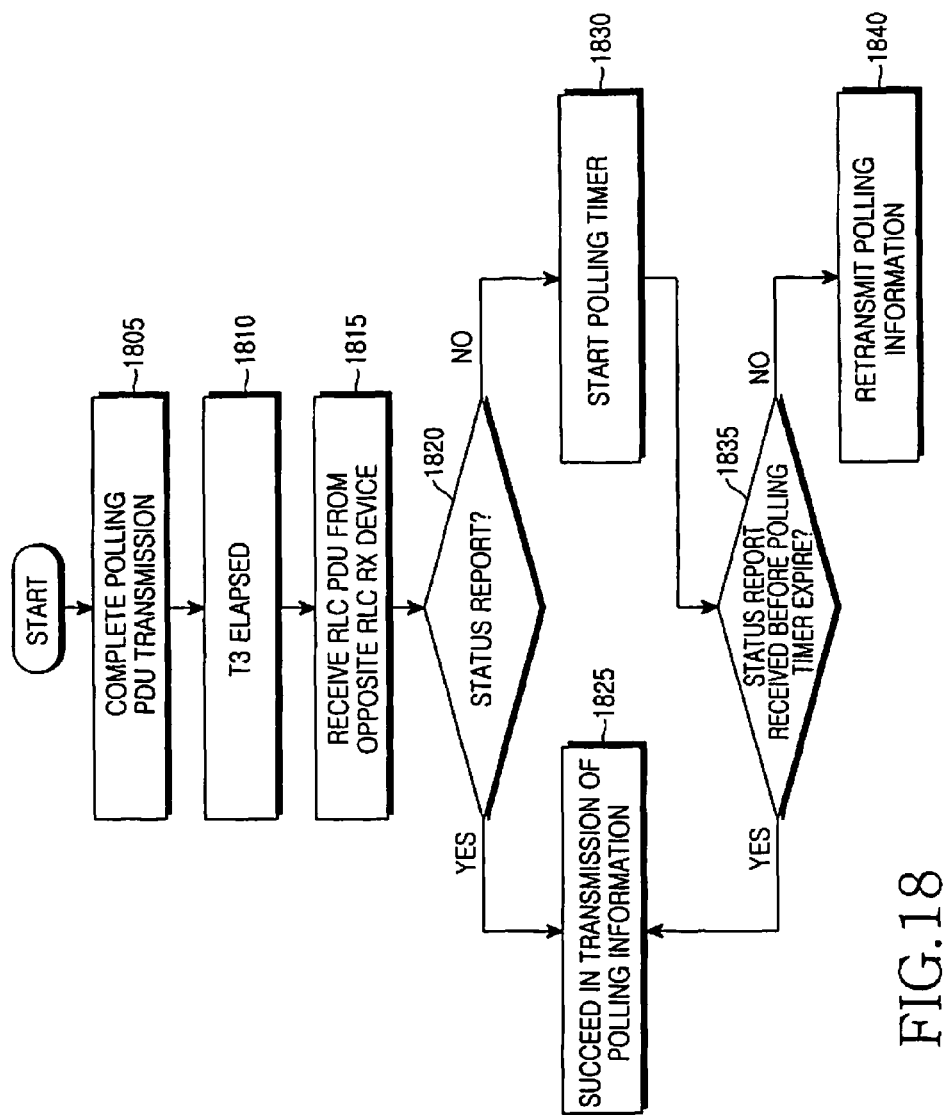
FIG. 18 is a flowchart illustrating an operation of a transmitter according to the fifth embodiment of the present invention.

FIG. 18 is a flowchart illustrating an operation of an RLC transmitter according to the fifth embodiment of the present invention.

If an RLC device successfully transmits an RLC PDU containing polling information in step 1805, i.e., if a packet containing a polling PDU is successfully transmitted in an HARQ level, the RLC device proceeds to step 1810 where it waits until a predetermined time T3 elapses. Since HARQ is applied for RLC PDU transmission/reception, there is a variable transmission delay according to the number of HARQ retransmissions. The elapsed time of T3 is for compensating for the transmission delay for the RLC PDU that the opposite RLC device transmitted. In other words, the RLC device waits for T3 to thereby prevent the polling timer from being started by the RLC PDU whose transmission was started from the opposite RLC device when a polling PDU is being transmitted.

After T3 has elapsed, if the terminal (or RLC device) receives an RLC PDU from the opposite RLC device at an arbitrary time in step 1815, the RLC device proceeds to step 1820. The term 'opposite RLC device' means another RLC device that receives an RLC PDU transmitted by the RLC device and transmits an RLC PDU to the RLC device, and the opposite RLC device belongs to the same logical channel as that of the RLC device. In step 1820, the RLC device determines if the received RLC PDU is a reception status report message or includes a reception status report message. If the received RLC PDU is a reception status report message or includes a reception status report message, the RLC device proceeds to step 1825, and otherwise, proceeds to step 1830.

In step 1825, the RLC device, since it has received a reception status report message, determines that polling information has been successfully transmitted, and then ends the process.

In step 1830, the RLC device starts the polling timer, and then proceeds to step 1835 where the RLC device determines if a reception status report message is received before the polling timer expires. If no reception status report message is received before the polling timer expires, the RLC device retransmits the polling information in step 1840. If a reception status report message is received before the polling timer expires, the RLC device proceeds to step 1825 where it determines that the polling information has been successfully transmitted, and then ends the process.

Sixth Embodiment

The sixth embodiment of the present invention provides a method for first resegmenting the last part of a polling PDU and then including polling information in the resegmented PDU before transmission during resegmented retransmission of the polling PDU.

When a polling PDU undergoes resegmented retransmission as the polling timer expires, it is general rule to include the polling information in the last segment. The expiration of the polling timer means a loss of the polling PDU or a loss of STATUS REPORT.

If the polling PDU was lost, it is preferable to retransmit the entire polling PDU. However, if the polling PDU was normally transmitted but the STATUS REPORT was lost, it is preferable to transmit only a part of the polling PDU, rather than transmitting the entire polling PDU.

The sixth embodiment of the present invention first resegments the last part of a payload before transmission rather than first resegmenting the first part of the payload as in the normal resegmented retransmission, if it should perform resegmented retransmission on a polling PDU due to the insufficient account of allocated transmission resources when it should retransmit the polling PDU for an arbitrary one of the foregoing reasons.

Figure 19:
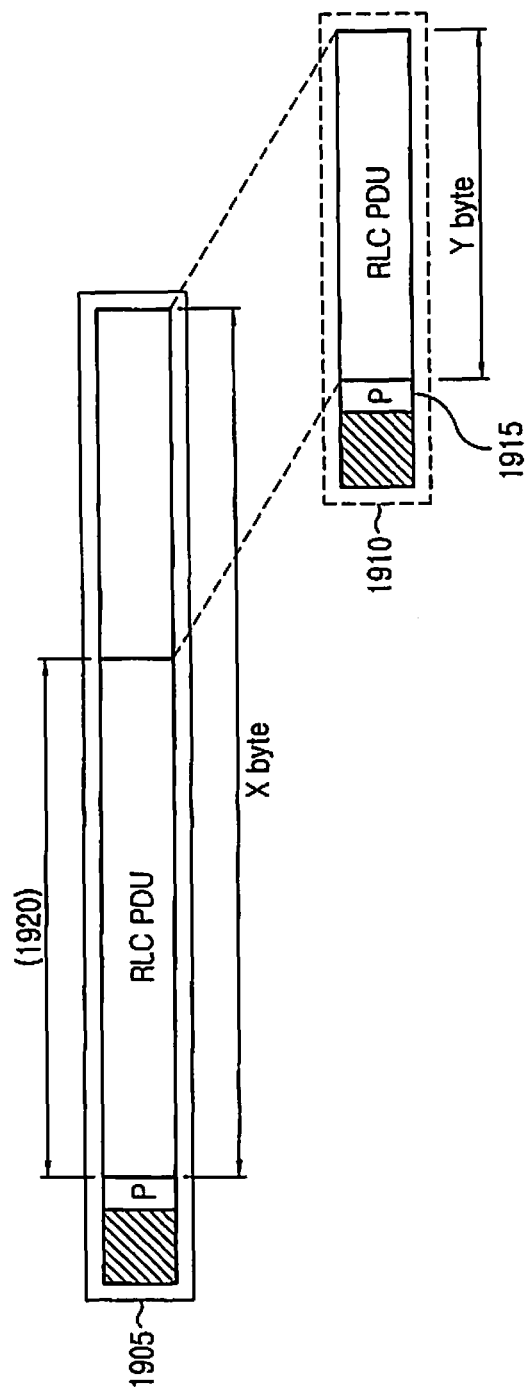
FIG. 19 is a diagram illustrating an overall operation of a sixth embodiment of the present invention.

FIG. 19 is a diagram for a description of an example of the sixth embodiment of the present invention.

Referring to FIG. 19, after transmitting a polling PDU 1905 with an X-byte payload, a terminal has a need to retransmit the RLC PDU for an arbitrary reason. In this case, if the terminal can include only a Y-byte payload therein because of insufficient transmission resources allocated for the RLC PDU retransmission, i.e., if the terminal should resegment the polling PDU in an RLC PDU with a Y-byte payload for its retransmission, the terminal generates a resegmented RLC PDU 1910 containing the last Y bytes in the payload of the original polling PDU, and includes polling information 1915 in the RLC PDU before transmission.

Since it is uncertain whether the retransmission of the polling PDU is caused by a loss of the polling PDU or by a loss of STATUS REPORT, the terminal does not transmit the remaining segment, i.e., the segment containing the remaining payload 1920 except for the previously transmitted Y bytes among the X original bytes, until it receives RLC STATUS REPORT.

Figure 20:
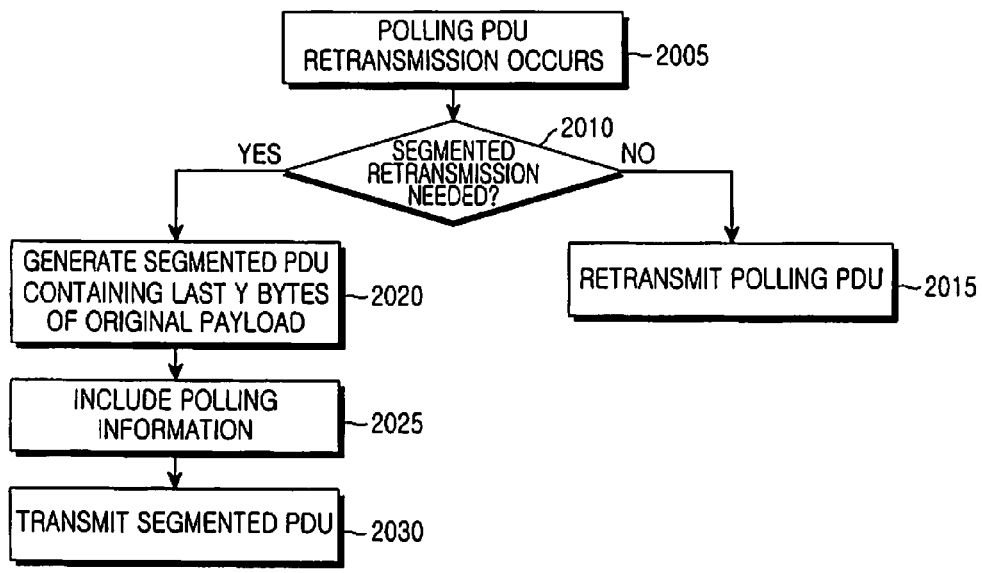
FIG. 20 is a signal flow diagram illustrating an operation of a terminal according to the sixth embodiment of the present invention.

FIG. 20 is a signal flow diagram illustrating an operation of a terminal according to the sixth embodiment of the present invention.

Referring to FIG. 20, if there is a need for retransmission of a polling PDU in step 2005 as a polling timer expires, a terminal performs a necessary operation of sending a request for transmission resources to a base station for the retransmission. If transmission resources are allocated from the base station, the terminal determines in step 2010 whether there is a need for resegmented retransmission.

If it is determined in step 2010 that a size of an RLC PDU transmittable over the allocated transmission resources is less than a size of the polling PDU to be retransmitted, meaning that there is a need for resegmented retransmission, the terminal proceeds to step 2020.

In step 2020, the terminal generates a resegmented PDU by resegmenting the last Y bytes of the payload of the polling PDU to be retransmitted. 'Y' corresponds to a payload size of the RLC PDU transmittable over the allocated transmission resources. In step 2025, the terminal includes polling information in the generated resegmented PDU. For example, the terminal sets a polling bit of the RLC PDU header as 'yes'.

In step 2030, the terminal transmits the resegmented PDU and then ends the process. Thereafter, even though transmission resources are allocated, the segment left after the resegmentation is not retransmitted unless an RLC STATUS REPORT requesting retransmission of the segment left after the resegmented retransmission is received.

However, if it is determined in step 2010 that the size of the RLC PDU transmittable over the allocated transmission resources is greater than or equal to the size of the polling PDU to be retransmitted, the terminal proceeds to step 2015 where it retransmits the polling PDU, and then ends the process.

As is apparent from the foregoing description, the present invention allows small-sized packets to be transmitted together if possible, rather than to be frequently and individually transmitted and received over a radio channel, thereby contributing to an increase in efficiency of the radio transmission resources. In addition, the present invention guarantees transmission reliability of the individually transmitted upper layer packets without using a reception status report, thereby contributing to an increase in efficiency of the radio transmission resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data by a transmitting apparatus in a communication system, the method comprising:
generating, by the transmitting apparatus, a radio link control (RLC) packet data unit (PDU) including first polling information, if the RLC PDU is a last RLC PDU;
transmitting the RLC PDU from the transmitting apparatus to a receiving apparatus;
generating, by the transmitting apparatus, a segmented RLC PDU; and
transmitting the segmented RLC PDU, from the transmitting apparatus, to a receiving apparatus,
wherein the RLC PDU is segmented if an amount of available resources is less than an amount of resources required for retransmitting the RLC PDU, and
wherein the segmented RLC PDU includes second Dolling information if the segmented RLC PDU is a last segmented RLC PDU.

2. The method of claim 1, wherein the first polling information and the second polling information are different.

3. The method of claim 1, further comprising:
starting a polling timer after transmitting the last segmented RLC PDU; and
retransmitting the second polling information included in the last segmented RLC PDU, if a reception status report corresponding to the second polling is not received by a time at which the polling timer expires.

4. The method of claim 1, wherein the RLC PDU is the last RLC PDU, if there is no subsequent RLC PDU transmission after transmission of the RLC PDU.

5. The method of claim 1, wherein the last segmented RLC PDU has no subsequent segmented RLC PDU transmission after transmission of the last segmented RLC PDU.

6. An apparatus for transmitting data in a communication system, the apparatus comprising:
a controller configured to generate a radio link control (RLC) packet data unit (PDU) including first polling information, if the RLC PDU is a last RLC PDU, and generate a segmented RLC PDU; and
transmitter configured to transmit the RLC PDU and the segmented RLC PDU to at least one receiving apparatus,
wherein the RLC PDU is segmented if an amount of available resources is less than an amount of resources required for retransmitting the RLC PDU, and
wherein the segmented RLC PDU includes second polling information if the segmented RLC PDU is a last segmented RLC PDU.

7. The apparatus of claim 6, wherein the first polling information and the second polling information are different.

8. The apparatus of claim 6, wherein the controller is further configured to start a polling timer after transmitting the last segmented RLC PDU, and retransmit the second polling information included in the last segmented RLC PDU, if a reception status report corresponding to the second polling information is not received by a time at which the polling timer expires.

9. The apparatus of claim 6, wherein the RLC PDU is the last RLC PDU, if there is no subsequent RLC PDU transmission after transmission of the RLC PDU.

10. The apparatus of claim 6, wherein the last segmented RLC PDU has no subsequent segmented RLC PDU transmission after transmission of the last segmented RLC PDU.

11. A method for transmitting data by a transmitting apparatus in a communication system, the method comprising:
segmenting, by the transmitting apparatus, a radio link control (RLC) packet data unit (PDU) to generate a segmented RLC PDU;
including, by the transmitting apparatus, first polling information in the segmented RLC PDU if the segmented RLC PDU is a last segmented RLC PDU; and
transmitting the segmented RLC PDU, from the transmitting apparatus, to a receiving apparatus.

12. The method of claim 11, wherein the RLC PDU is segmented, if an amount of available resources is less than an amount of resources required for retransmitting the RLC PDU.

13. The method of claim 12, wherein the RLC PDU includes second polling information, if the RLC PDU is a last RLC PDU to be transmitted.

14. The method of claim 13, wherein the second polling information and the first polling information are different.

15. The method of claim 13, wherein the RLC PDU is the last RLC PDU, if there is no subsequent RLC PDU transmission after transmission of the RLC PDU.

16. The method of claim 11, wherein the last segmented RLC PDU has no subsequent segmented RLC PDU transmission after transmission of the last segmented RLC PDU.

17. An apparatus for transmitting data in a communication system, the apparatus comprising:
a controller configured to segment radio link control (RLC) packet data unit (PDU) for generation of a segmented RLC PDU, and include first polling information in the segmented RLC PDU if the segmented RLC PDU is a last segmented RLC PDU; and
a transmitter configured to transmit the segmented RLC PDU to a receiving apparatus.

18. The apparatus of claim 17, wherein the RLC PDU is segmented, if an amount of available resources is less than an amount of resources required for retransmitting the RLC PDU.

19. The apparatus of claim 18, wherein the RLC PDU includes second polling information, if the RLC PDU is a last RLC PDU to be transmitted.

20. The apparatus of claim 19, wherein the second polling information and the first polling information are different.

21. The apparatus of claim 19, wherein the RLC PDU is the last RLC PDU, if there is no subsequent RLC PDU transmission after transmission of the RLC PDU.

22. The apparatus of claim 17, wherein the last segmented RLC PDU has no subsequent segmented RLC PDU transmission after transmission of the last segmented RLC PDU.

23. An apparatus for transmitting data in a communication system, the apparatus comprising:
a memory; and
at least one processor coupled to memory and operative to: (i) generate a radio link control (RLC) packet data unit (PDU) including first polling information, if the RLC PDU is a last RLC PDU; (ii) transmit the RLC PDU to a receiving apparatus; (iii) generate a segmented RLC PDU; and (iv) transmit the segmented RLC PDU to a receiving apparatus, wherein the RLC PDU is segmented if an amount of available resources is less than an amount of resources required for retransmitting the RLC PDU, and wherein the segmented RLC PDU includes second polling information if the segmented RLC PDU is a last segmented RLC PDU.

24. An article of manufacture for transmitting data in a communication system, comprising a non-transitory machine readable medium containing one or more programs which when executed implement the steps of:

generating a radio link control (RLC) packet data unit (PDU) including first polling information, if the RLC PDU is a last RLC PDU;

transmitting the RLC PDU to a receiving apparatus;

generating a segmented RLC PDU; and transmitting the segmented RLC PDU to a receiving apparatus, wherein the RLC PDU is segmented if an amount of available resources is less than an amount of resources required for retransmitting the RLC PDU, and wherein the segmented RLC PDU includes second polling information if the segmented RLC PDU is a last segmented RLC PDU.

* * * * *

UNITED STATES PATENT AND TRADEMARK OFFICE
CERTIFICATE OF CORRECTION

PATENT NO. : 9,049,718 B2  Page 1 of 1
APPLICATION NO. : 13/712341
DATED : June 2, 2015
INVENTOR(S) : Soeng-Hun Kim et al.

It is certified that error appears in the above-identified patent and that said Letters Patent is hereby corrected as shown below:

In the claims

Column 23, line 43, Claim 3, --information-- should be added after "polling".

Signed and Sealed this
Twentieth Day of October, 2015

Michelle K. Lee
*Director of the United States Patent and Trademark Office*